US012682830B2

(12) United States Patent
Lee

(10) Patent No.: US 12,682,830 B2
(45) Date of Patent: *Jul. 14, 2026

(54) PIXEL OF A DISPLAY DEVICE, AND DISPLAY DEVICE

(71) Applicant: Samsung Display Co., Ltd., Yongin-si (KR)

(72) Inventor: Jaehoon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,523

(22) Filed: May 13, 2024

(65) Prior Publication Data

US 2024/0296789 A1 Sep. 5, 2024

Related U.S. Application Data

(63) Continuation of application No. 17/960,470, filed on Oct. 5, 2022, now Pat. No. 11,984,063.

(30) Foreign Application Priority Data

Feb. 16, 2022 (KR) ........................ 10-2022-0020244

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC ...... G09G 3/32–3291; G09G 2300/0421–043; G09G 2300/0439;
(Continued)

(56) References Cited

U.S. PATENT DOCUMENTS 10,360,840 B2 * 7/2019 Matsueda ............ G09G 3/3291
2008/0042945 A1 2/2008 Mutsukura et al.
(Continued)

FOREIGN PATENT DOCUMENTS

KR 1020060001373 A 2/2007
KR 101142994 B1 5/2012
(Continued)

*Primary Examiner* — Nathan Danielsen
(74) *Attorney, Agent, or Firm* — CANTOR COLBURN LLP

(57) ABSTRACT

A pixel includes: a first transistor including a gate coupled to a first node, a first terminal, and a second terminal coupled to a second node; a first capacitor coupled between the first and second nodes; a second transistor including a gate receiving a first signal, a first terminal coupled to a data line, and a second terminal coupled to the first node; a third transistor including a gate receiving a second signal, a first terminal receiving a reference voltage, and a second terminal coupled to the first node; a fourth transistor including a gate receiving a third signal, a first terminal coupled to the second node, and a second terminal receiving an initialization voltage; a light emitting element including an anode; and a fifth transistor including a gate receiving a fourth signal, a first terminal coupled to the second node, and a second terminal coupled to the anode.

17 Claims, 23 Drawing Sheets

(52) U.S. Cl.
CPC ............... *G09G 2310/0278* (2013.01); *G09G 2320/0233* (2013.01); *G09G 2320/045* (2013.01)

(58) Field of Classification Search
CPC ... G09G 2300/0809; G09G 2300/0819; G09G 2300/0842; G09G 2300/0852; G09G 2300/0861; G09G 2300/0866; G09G 2310/0264; G09G 2310/0267; G09G 2310/0278; G09G 2310/06; G09G 2310/08; G09G 2320/0223; G09G 2320/0233; G09G 2320/0242; G09G 2320/0257; G09G 2320/029; G09G 2320/0295; G09G 2320/0693

See application file for complete search history.

(56) References Cited

U.S. PATENT DOCUMENTS

| | | | | |
|---|---|---|---|---|
| 2014/0035799 | A1* | 2/2014 | Bae | G09G 3/3233 345/82 |
| 2014/0111503 | A1 | 4/2014 | Kwon et al. | |
| 2016/0275855 | A1 | 9/2016 | Omata et al. | |
| 2018/0061317 | A1 | 3/2018 | Morita et al. | |
| 2020/0226978 | A1 | 7/2020 | Lin et al. | |
| 2022/0148510 | A1* | 5/2022 | Ryu | G09G 3/3258 |
| 2023/0298522 | A1* | 9/2023 | Kobayashi | G09G 3/3233 345/76 |

FOREIGN PATENT DOCUMENTS

| | | | |
|---|---|---|---|
| KR | 1020170124522 | A | 8/2019 |
| KR | 102174856 | B1 | 11/2020 |
| KR | 1020190015664 | A | 2/2022 |

* cited by examiner

FIG. 8

PIXEL HAVING NO T5

130

$$IEL=K\left[\frac{Chold+Cel}{Cst+Chold+Cel}(VDAT-VREF)\right]^2$$

| Cel | IEL |
|---|---|
| $5*10^{-13}F$ | $4.48*10^{-10}A$ |
| $6*10^{-13}F$ | $8.61*10^{-10}A$ |
| $7*10^{-13}F$ | $14.43*10^{-10}A$ |

PIXEL INCLUDING T5

140

$$IEL=K\left[\frac{Chold}{Cst+Chold}(VDAT-VREF)\right]^2$$

| Cel | IEL |
|---|---|
| $5*10^{-13}F$ | $4.74*10^{-10}A$ |
| $6*10^{-13}F$ | $4.80*10^{-10}A$ |
| $7*10^{-13}F$ | $4.85*10^{-10}A$ |

FIG. 10B

PIXEL HAVING NO T5

| CURRENT CHARACTERISTIC | IEL |
|---|---|
| CC1 | $4.37*10^{-10}$A |
| CC2 | $5.29*10^{-10}$A |
| CC3 | $6.18*10^{-10}$A |

⇨

PIXEL INCLUDING T5 (T1 IS TURNED ON DURING CCP)

| CURRENT CHARACTERISTIC | ICCP | V of N2 | IEL |
|---|---|---|---|
| CC1 | $1.56*10^{-9}$A | 2.2076 V | $4.40*10^{-10}$A |
| CC2 | $1.59*10^{-9}$A | 2.2101 V | $4.81*10^{-10}$A |
| CC3 | $1.63*10^{-9}$A | 2.2139 V | $5.25*10^{-10}$A |

PIXEL OF A DISPLAY DEVICE, AND DISPLAY DEVICE

This application is a continuation of U.S. patent application Ser. No. 17/960,470, filed on Oct. 5, 2022, which claims priority to Korean Patent Application No. 10-2022-0020244, filed on Feb. 16, 2022, and all the benefits accruing therefrom under 35 U.S.C. § 119, the content of which in its entirety is herein incorporated by reference.

BACKGROUND

1. Field

Embodiments of the present inventive concept relate to a display device, and more particularly to a pixel of a display device, and the display device.

2. Description of the Related Art

A pixel of a display device may include a storage capacitor, a scan transistor that transfers a data voltage to the storage capacitor in response to a scan signal, a driving transistor that generates a current based on the data voltage stored in the storage capacitor, and a light emitting element that emits light based on the current generated by the driving transistor.

In a case where a threshold voltage of a driving transistor of a pixel is changed, the pixel may not emit with desired luminance. To eliminate or reduce a luminance error caused by the change of the threshold voltage, the pixel may perform a threshold voltage compensation operation that compensates for the threshold voltage of the driving transistor.

SUMMARY

However, even if each pixel performs the threshold voltage compensation operation, a capacitance of a parasitic capacitor of a light emitting element of the pixel may be changed, and the pixel may not emit with the desired luminance because of the change of the capacitance of the parasitic capacitor.

Some embodiments provide a pixel of a display device capable of emitting light with desired luminance.

Some embodiments provide a display device including a pixel of a display device capable of emitting light with desired luminance.

According to embodiments, there is provided a pixel of a display device including: a first transistor including a gate coupled to a first node, a first terminal coupled to a first power supply voltage line, and a second terminal coupled to a second node; a first capacitor coupled between the first node and the second node; a second transistor including a gate for receiving a first signal, a first terminal coupled to a data line, and a second terminal coupled to the first node; a third transistor including a gate for receiving a second signal, a first terminal for receiving a reference voltage, and a second terminal coupled to the first node, a fourth transistor including a gate for receiving a third signal, a first terminal coupled to the second node, and a second terminal for receiving an initialization voltage, a light emitting element including an anode, and a cathode coupled to a second power supply voltage line, and a fifth transistor including a gate for receiving a fourth signal, a first terminal coupled to the second node, and a second terminal coupled to the anode.

In embodiments, during a period when the third transistor is turned on and the fourth transistor is turned off, the fifth transistor may be turned off.

In embodiments, during the period when the third transistor is turned on and the fourth transistor is turned off, the third transistor may transfer the reference voltage to the first node, and the first transistor may change a voltage of the second node to a voltage corresponding to a threshold voltage of the first transistor subtracted from the reference voltage.

In embodiments, during a period when the second transistor is turned on, the fifth transistor may be turned off.

In embodiments, during the period when the second transistor is turned on, the gate of the first transistor may receive a data voltage through the second transistor, and the first terminal of the first transistor may receive a power supply voltage provided from the first power supply voltage line.

In embodiments, during a period when the second transistor is turned on, the first transistor may be turned on.

In embodiments, when a current characteristic of the first transistor is changed, a voltage of the second node may be changed by a current of the first transistor to compensate for a change of the current characteristic of the first transistor.

In embodiments, the data line and an electrode of the second terminal of the first transistor may not overlap each other such that a second parasitic capacitor between the second node and the data line has a capacitance less than a capacitance of a first parasitic capacitor between the anode and the data line.

In embodiments, the second transistor may transfer a data voltage provided from the data line to the first node in response to the first signal, the third transistor may transfer the reference voltage to the first node in response to the second signal, the fourth transistor may transfer the initialization voltage to the second node in response to the third signal, and the fifth transistor may selectively couple the second node to the anode in response to the fourth signal.

In embodiments, at least one of the first through fifth transistors may be implemented with an n-type metal oxide semiconductor ("NMOS") transistor.

In embodiments, each frame period for the pixel may include an initialization period in which the first node and the second node are initialized, a threshold voltage compensation period in which a threshold voltage of the first transistor is stored in the first capacitor, a data writing period in which a data voltage provided from the data line is transferred to the first node, a current characteristic compensation period in which a change of a current characteristic of the first transistor is compensated, and an emission period in which the light emitting element emits light.

In embodiments, in the initialization period, the second signal and the third signal may have an active level, the first signal and the fourth signal may have an inactive level, the third transistor may be turned on in response to the second signal having the active level to apply the reference voltage to the first node, the fourth transistor may be turned on in response to the third signal having the active level to apply the initialization voltage to the second node, and the fifth transistor may be turned off in response to the fourth signal having the inactive level to separate the second node from the anode.

In embodiments, in the threshold voltage compensation period, the second signal may have an active level, the first signal, the third signal and the fourth signal may have an inactive level, the third transistor may be turned on in response to the second signal having the active level to apply the reference voltage to the first node, the first transistor may operate as a source follower to change a voltage of the second node to a voltage corresponding to the threshold voltage of the first transistor subtracted from the reference voltage, and the fifth transistor may be turned off in response to the fourth signal having the inactive level to separate the second node from the anode.

In embodiments, in the data writing period, the first signal may have an active level, the second signal, the third signal and the fourth signal may have an inactive level, the second transistor may be turned on in response to the first signal having the active level to apply the data voltage to the first node, and the fifth transistor may be turned off in response to the fourth signal having the inactive level to separate the second node from the anode.

In embodiments, in the current characteristic compensation period, the second signal, the third signal and the fourth signal may have an inactive level, the first terminal of the first transistor may receive a power supply voltage provided from the first power supply voltage line, the first transistor may be turned on to apply a current to the second node, and the fifth transistor may be turned off in response to the fourth signal having the inactive level to separate the second node from the anode.

In embodiments, the data writing period may overlap the current characteristic compensation period.

In embodiments, the data writing period may be separate from the current characteristic compensation period.

In embodiments, in the emission period, the fourth signal may have an active level, the first signal, the second signal and the third signal may have an inactive level, the fifth transistor may be turned on in response to the fourth signal having the active level to couple the second node to the anode, and the light emitting element may emit light.

In embodiments, the pixel may further include a second capacitor coupled between the first power supply voltage line and the second node.

In embodiments, the pixel may further include a sixth transistor, which transfers the initialization voltage to the anode in response to the third signal.

In embodiments, the pixel may further include a sixth transistor including a gate for receiving the third signal, a first terminal coupled to the anode, and a second terminal for receiving the initialization voltage.

In embodiments, the pixel may further include a sixth transistor, which transfers the initialization voltage to the anode in response to the second signal.

In embodiments, the pixel may further include a sixth transistor including a gate for receiving the second signal, a first terminal coupled to the anode, and a second terminal for receiving the initialization voltage.

In embodiments, the pixel may further include a seventh transistor disposed between the first power supply voltage line and the first terminal of the first transistor.

According to embodiments, there is provided a pixel of a display device including: a first transistor including a gate coupled to a first node, a first terminal, and a second terminal coupled to a second node; a first capacitor coupled between the first node and the second node; a second transistor including a gate for receiving a first signal, a first terminal coupled to a data line, and a second terminal coupled to the first node; a third transistor including a gate for receiving a second signal, a first terminal for receiving a reference voltage, and a second terminal coupled to the first node; a fourth transistor including a gate for receiving a third signal, a first terminal coupled to the second node, and a second terminal for receiving an initialization voltage, a light emitting element including an anode, and a cathode coupled to a second power supply voltage line; a fifth transistor including a gate for receiving a fourth signal, a first terminal coupled to the second node, and a second terminal coupled to the anode; and a seventh transistor including a gate for receiving a fifth signal, a first terminal coupled to a first power supply voltage line, and a second terminal coupled to the first terminal of the first transistor.

In embodiments, the pixel may further include a second capacitor coupled between the first power supply voltage line and the second node.

In embodiments, the seventh transistor may selectively couple the first terminal of the first transistor to the first power supply voltage line in response to the fifth signal.

In embodiments, the seventh transistor may be turned off in response to the fifth signal having an inactive level to separate the first terminal of the first transistor from the first power supply voltage line in an initialization period, may be turned on in response to the fifth signal having an active level to couple the first terminal of the first transistor to the first power supply voltage line in a threshold voltage compensation period, may be turned off in response to the fifth signal having the inactive level to separate the first terminal of the first transistor from the first power supply voltage line in a data writing period, may be turned on in response to the fifth signal having the active level to couple the first terminal of the first transistor to the first power supply voltage line in a current characteristic compensation period, and may be turned on in response to the fifth signal having the active level to couple the first terminal of the first transistor to the first power supply voltage line in an emission period.

In embodiments, the pixel may further include a sixth transistor including a gate for receiving the third signal, a first terminal coupled to the anode, and a second terminal for receiving the initialization voltage.

In embodiments, the pixel may further include a sixth transistor including a gate for receiving the second signal, a first terminal coupled to the anode, and a second terminal for receiving the initialization voltage.

According to embodiments, there is provided a display device including: a display panel including a plurality of pixels; a data driver, which provides a data voltage to each of the plurality of pixels; a scan driver, which provides a first signal, a second signal and a third signal to each of the plurality of pixels; an emission driver, which provides a fourth signal to each of the plurality of pixels; and a controller, which controls the data driver, the scan driver and the emission driver. Each of the plurality of pixels includes: a first transistor including a gate coupled to a first node, a first terminal coupled to a first power supply voltage line, and a second terminal coupled to a second node; a first capacitor coupled between the first node and the second node; a second transistor including a gate for receiving the first signal, a first terminal coupled to a data line, and a second terminal coupled to the first node; a third transistor including a gate for receiving the second signal, a first terminal for receiving a reference voltage, and a second terminal coupled to the first node; a fourth transistor including a gate for receiving the third signal, a first terminal coupled to the second node, and a second terminal for receiving an initialization voltage, a light emitting element including an anode, and a cathode coupled to a second power supply voltage line; and a fifth transistor including a gate for receiving the fourth signal, a first terminal coupled to the second node, and a second terminal coupled to the anode.

As described above, in a pixel of a display device and the display device according to embodiments, a fifth transistor may selectively couple a second node (e.g., a source node) to an anode of a light emitting element in response to a fourth signal (e.g., an emission signal). Accordingly, a gate-source voltage of a first transistor (e.g., a driving transistor) may not be affected by a parasitic capacitor of the light emitting element, and thus the pixel may emit light with desired luminance.

Further, in the pixel of the display device and the display device according to embodiments, a first terminal (e.g., a drain) of the first transistor (e.g., the driving transistor) may receive a first power supply voltage (e.g., a high-power supply voltage) in a current characteristic compensation period, and the first transistor may be turned on in the current characteristic compensation period. Accordingly, even if a current characteristic of the first transistor is changed, a voltage of the second node (e.g., the source node) may be changed to compensate for the change of the current characteristic, and thus the pixel may emit light with the desired luminance.

BRIEF DESCRIPTION OF THE DRAWINGS

Illustrative, non-limiting embodiments will be more clearly understood from the following detailed description in conjunction with the accompanying drawings.

FIG. 8 is a diagram illustrating an example of a light emission current according to a capacitance change of a parasitic capacitor of a light emitting element in a pixel having no fifth transistor, and an example of a light emission current according to a capacitance change of a parasitic capacitor of a light emitting element in a pixel including a fifth transistor.

FIG. 10B is a diagram for describing an example of light emission currents of a pixel having no fifth transistor and a pixel including a fifth transistor according to the current characteristics of the first transistor.

DETAILED DESCRIPTION

It will be understood that when an element is referred to as being "coupled to" another element, it can be directly coupled to the other element or intervening elements may be present therebetween. In contrast, when an element is referred to as being "directly coupled to" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, embodiments of the present inventive concept will be explained in detail with reference to the accompanying drawings.

Figure 1:
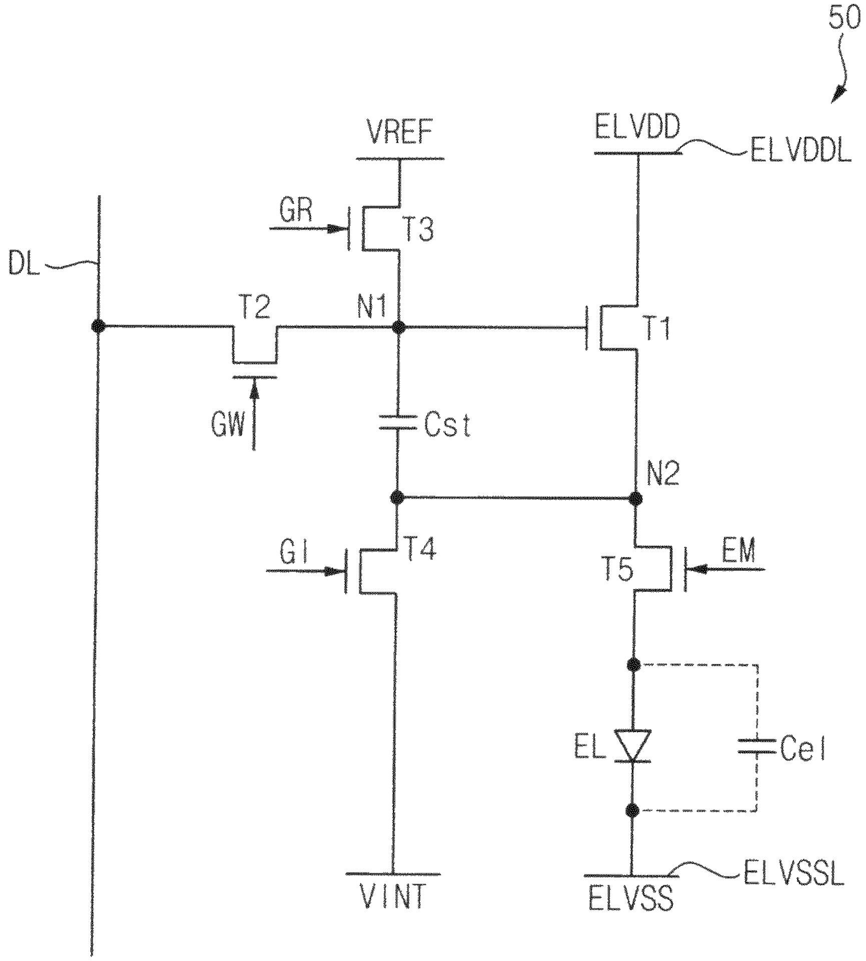
FIG. 1 is a circuit diagram illustrating a pixel of a display device according to embodiments.

FIG. 1 is a circuit diagram illustrating a pixel of a display device according to embodiments.

Referring to FIG. 1, a pixel 50 according to embodiments may include a first transistor T1, a first capacitor Cst, a second transistor T2, a third transistor T3, a fourth transistor T4, a light emitting element EL and a fifth transistor T5.

The first transistor T1 may generate a light emission current provided to the light emitting element EL based on a voltage between a first node N1 and a second node N2, or a voltage stored in the first capacitor Cst. In some embodiments, the first node N1 may be a gate node coupled to a gate of the first transistor T1, and the second node N2 may be a source node coupled to a source of the first transistor T1. The first transistor T1 may be referred to as a driving transistor for driving the light emitting element EL. In some embodiments, the first transistor T1 may include a gate coupled to the first node N1, a first terminal (e.g., a drain) coupled to a first power supply voltage line ELVDDL for transferring a first power supply voltage ELVDD (e.g., a high-power supply voltage), and a second terminal (e.g., the source) coupled to the second node N2.

The first capacitor Cst may be coupled between the first node N1 and the second node N2. The first capacitor Cst may be referred to as a storage capacitor that stores a data voltage transferred from a data line DL through the second transistor T2. In some embodiments, the first capacitor Cst may include a first electrode coupled to the first node N1, and a second electrode coupled to the second node N2.

The second transistor T2 may transfer a data voltage provided from the data line DL to the first node N1 in response to a first signal GW. The first signal GW may be referred to as a data writing signal, and the second transistor T2 may be referred to as a scan transistor for transferring the data voltage provided from the data line DL to the first node N1. In some embodiments, the second transistor T2 may include a gate for receiving the first signal GW, a first terminal coupled to the data line DL, and a second terminal coupled to the first node N1.

The third transistor T3 may transfer a reference voltage VREF to the first node N1 in response to a second signal GR. The second signal GR may be referred to as a reset signal or a first initialization signal, and the third transistor T3 may be referred to as a reset transistor for applying the reference voltage VREF to the first node N1. In some embodiments, the third transistor T3 may include a gate for receiving the second signal GR, a first terminal for receiving the reference voltage VREF, and a second terminal coupled to the first node N1.

The fourth transistor T4 may transfer an initialization voltage VINT to the second node N2 in response to a third signal GI. The third signal GI may be referred to as a second initialization signal, and the fourth transistor T4 may be referred to as an initialization transistor for initializing the second node N2. In some embodiments, the fourth transistor T4 may include a gate for receiving the third signal GI, a first terminal coupled to the second node N2, and a second terminal for receiving the initialization voltage VINT.

The light emitting element EL may emit light based on the light emission current generated by the first transistor T1. In some embodiments, the light emitting element EL may be, but not limited to, an organic light emitting diode ("OLED"). In other embodiments, the light emitting element EL may be any suitable light emitting element. For example, the light emitting element EL may be a nano light emitting diode ("NED"), a quantum dot ("QD") light emitting diode, a micro light emitting diode, an inorganic light emitting diode, or any other suitable light emitting element. In some embodiments, the light emitting element EL may include an anode coupled to the fifth transistor T5, and a cathode coupled to a second power supply voltage line ELVSSL for transferring a second power supply voltage ELVSS (e.g., a low power supply voltage). In some embodiments, the light emitting element EL may have a parasitic capacitor Cel between the anode of the light emitting element EL and the second power supply voltage line ELVSSL.

The fifth transistor T5 may selectively couple the anode of the light emitting element EL to the second node N2. The fourth signal EM may be referred to as an emission signal, and the fifth transistor T5 may be referred to as an emission transistor for forming a path of the light emission current from the first power supply voltage line ELVDDL to the second power supply voltage line ELVSSL. In some embodiments, the fifth transistor T5 may include a gate for receiving the fourth signal EM, a first terminal coupled to the second node N2, and a second terminal coupled to the anode of the light emitting element EL.

Figure 2:
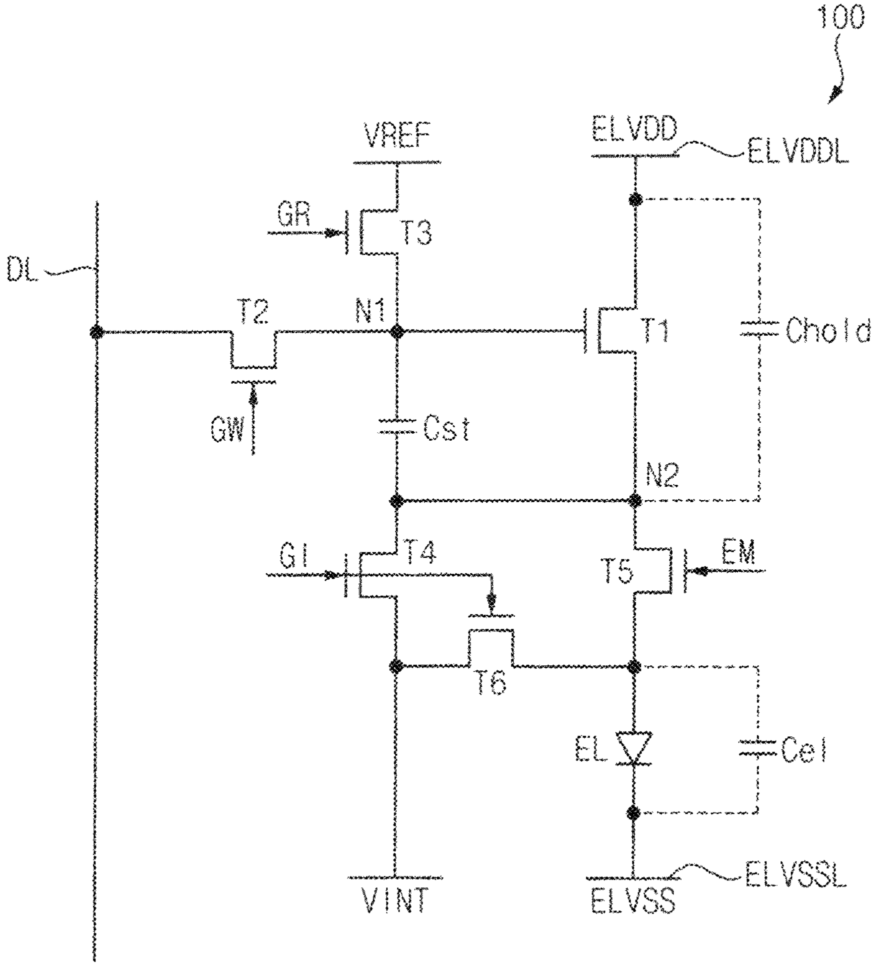
FIG. 2 is a circuit diagram illustrating a pixel of a display device according to embodiments.

FIG. 2 is a circuit diagram illustrating a pixel of a display device according to embodiments.

Referring to FIG. 2, a pixel 100 according to embodiments may include a first transistor T1, a first capacitor Cst, a second capacitor Chold, a second transistor T2, a third transistor T3, a fourth transistor T4, a light emitting element EL, a fifth transistor T5 and a sixth transistor T6. Compared with a pixel 50 of FIG. 1, the pixel 100 of FIG. 2 may further include the second capacitor Chold and the sixth transistor T6.

The second capacitor Chold may be coupled between a first power supply voltage line ELVDDL and a second node N2. The second capacitor Chold may be referred to as a holding capacitor for holding a voltage of the second node N2. In some embodiments, the second capacitor Chold may include a first electrode coupled to the first power supply voltage line ELVDDL, and a second electrode coupled to the second node N2. In some embodiments, the second capacitor Chold may be, but not limited to, a parasitic capacitor between the first power supply voltage line ELVDDL and the second node N2 (or a second electrode of the first capacitor Cst).

The sixth transistor T6 may transfer an initialization voltage VINT to an anode of the light emitting element EL in response to a third signal GI. The sixth transistor T6 may be referred to as an anode initialization transistor for initializing the anode of the light emitting element EL. In some embodiments, the sixth transistor T6 may include a gate for receiving the third signal GI, a first terminal coupled to the anode of the light emitting element EL, and a second terminal for receiving the initialization voltage VINT.

In some embodiments, the first through sixth transistors T1 through T6 may be implemented with, but not limited to, oxide transistors. In other embodiments, a portion or all of the first through sixth transistors T1 through T6 may be implemented with low-temperature polycrystalline silicon ("LTPS") transistors. For example, the second, third, fourth and sixth transistors T2, T3, T4 and T6 may be implemented with the oxide transistors, and the first and fifth transistors T1 and T5 may be implemented with the LTPS transistors.

Figure 13:
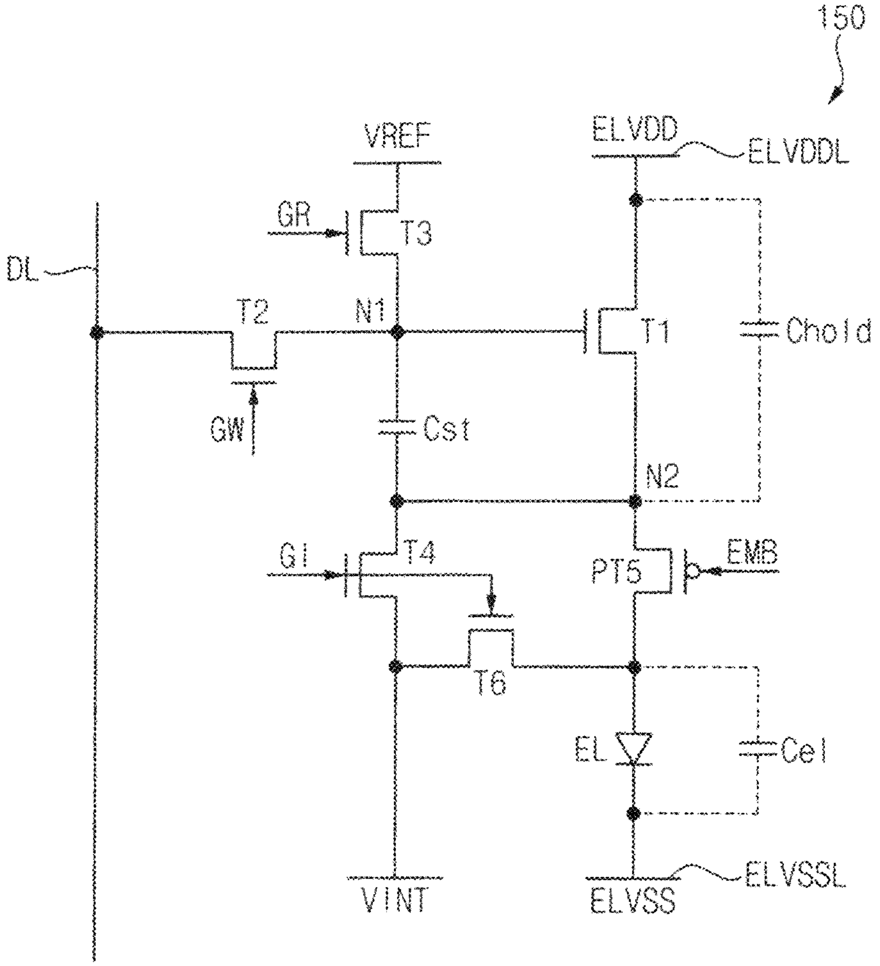
FIG. 13 is a circuit diagram illustrating a pixel of a display device according to embodiments.

Further, in some embodiments, as illustrated in FIG. 2, the first through sixth transistors T1 through T6 may be implemented with, but not limited to, n-type metal oxide semiconductor (NMOS) transistors. In other embodiments, a portion or all of the first through sixth transistors T1 through T6 may be implemented with p-type metal oxide semiconductor ("PMOS") transistors. For example, as illustrated in FIG. 13, the first, second, third, fourth and sixth transistors T1, T2, T3, T4 and T6 may be implemented with the NMOS transistors, and the fifth transistor PT5 may be implemented with the PMOS transistor.

In the pixel 100 according to embodiments, as described below with reference to FIGS. 5 and 6, during a period (e.g., a threshold voltage compensation period VCP in which a threshold voltage VTH of the first transistor T1 is stored in the first capacitor Cst) when the third transistor T3 is turned on and the fourth transistor T4 is turned off, the third transistor T3 may transfer a reference voltage VREF to a first node N1, and the first transistor T1 may operate as a source follower to change the voltage of the second node N2 close to the reference voltage VREF at the first node N1. For example, the first transistor T1 may change the voltage of the second node N2 to a voltage corresponding to 'a threshold voltage VTH of the first transistor T1 subtracted from the reference voltage VREF' by operating as the source follower, and thus the first capacitor Cst may store the threshold voltage VTH of the first transistor T1 between first and second electrodes of the first capacitor Cst. Further, during the period (e.g., the threshold voltage compensation period VCP) when the third transistor T3 is turned on and the fourth transistor T4 is turned off, the fifth transistor T5 may be turned off to separate the second node N2 from the anode of the light emitting element EL. Accordingly, compared with a pixel having no fifth transistor T5, or a pixel where the second node N2 is directly coupled to the anode of the light emitting element, the pixel 100 according to embodiments may more accurately compensate for the threshold voltage VTH of the first transistor T1.

Further, in the pixel 100 according to embodiments, as described below with reference to FIGS. 7 and 8, during a period (e.g., a data writing period WP in which a data voltage is transferred to the first node N1) when the second transistor T2 is turned on, the fifth transistor T5 may be turned off to separate the second node N2 from the anode of the light emitting element EL. Accordingly, a gate-source voltage of the first transistor T1 may not be affected by a parasitic capacitor Cel of the light emitting element EL, and thus a light emission current generated by the first transistor T1 may not be affected by the parasitic capacitor Cel of the light emitting element EL. Therefore, even if a capacitance of the parasitic capacitor Cel of the light emitting element EL is changed, the pixel 100 may emit light with desired luminance.

Further, as described above, since the second node N2 is separated from the anode of the light emitting element EL during the threshold voltage compensation period VCP and the data writing period WP, the voltage of the second node N2 may not be affected by a first parasitic capacitor (Cpara1 in FIG. 12A) between the anode of the light emitting element EL and a data line DL, and thus may not be affected by a voltage fluctuation of the data line DL. However, although the voltage of the second node N2 may be affected by a second parasitic capacitor (Cpara2 in FIG. 12A) between the second node N2 and the data line DL, a capacitance of the second parasitic capacitor may be much less than a capacitance of the first parasitic capacitor. In some embodiments, as described below with reference to FIGS. 12A and 12B, an electrode (e.g., a source electrode) of a second terminal of the first transistor T1 may not overlap the data line DL in a plan view (i.e., FIG. 12B) such that the second parasitic capacitor Cpara2 between the second node N2 and the data line DL may have a capacitance less than a capacitance of the first parasitic capacitor Cpara1 between the anode of the light emitting element EL and the data line DL.

Further, in the pixel 100 according to embodiments, as described below with reference to FIGS. 9, 10A and 10B, during the data writing period WP and/or a current characteristic compensation period CCP in which a change of a current characteristic of the first transistor T1 is compensated, a gate of the first transistor T1 may receive the data voltage, a first terminal of the first transistor T1 may receive a first power supply voltage ELVDD, and thus the first transistor T1 may be turned on. Accordingly, even if the current characteristic of the first transistor T1 is changed, in the data writing period WP and/or the current characteristic compensation period CCP, the voltage of the second node N2 may be changed by a current of the first transistor T1 to compensate for the change of a current characteristic.

Hereinafter, an example of an operation of the pixel 100 according to embodiments will be described below with reference to FIGS. 2 through 11.

Figure 3:
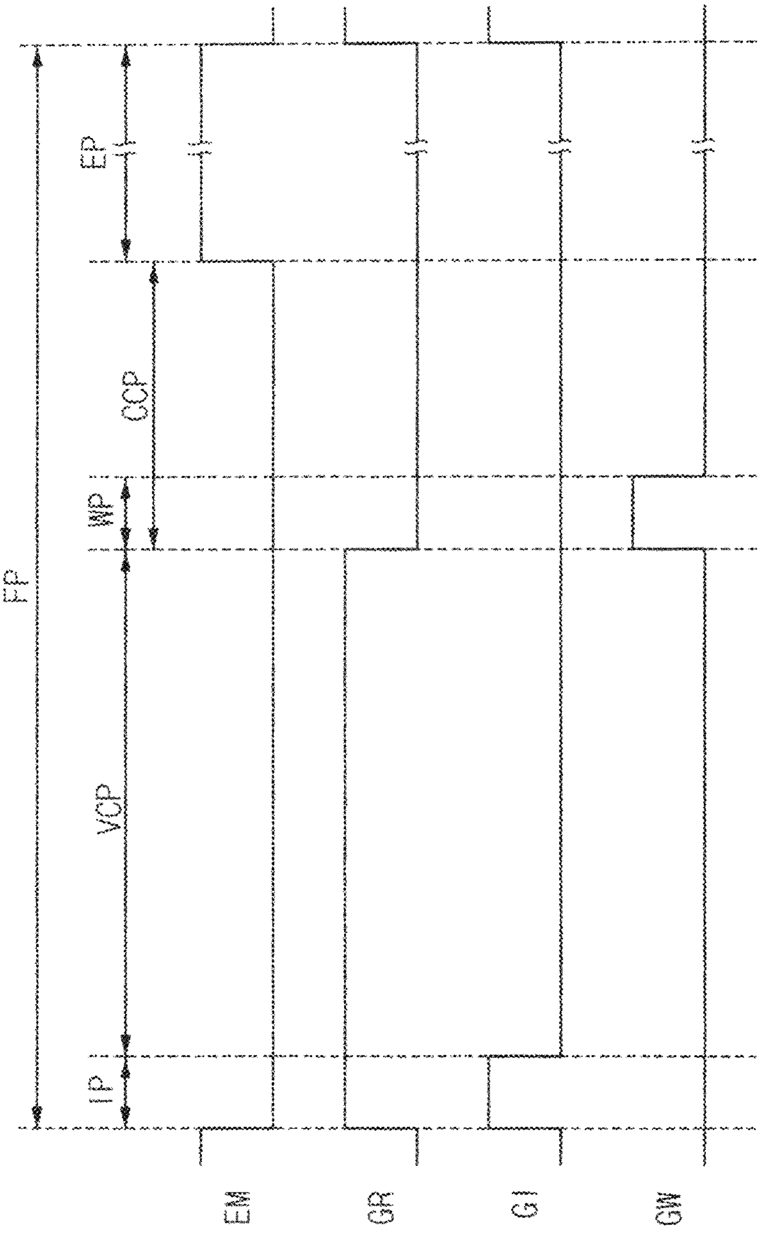
FIG. 3 is a timing diagram for describing an example of an operation of a pixel of a display device according to embodiments.
Figure 4:
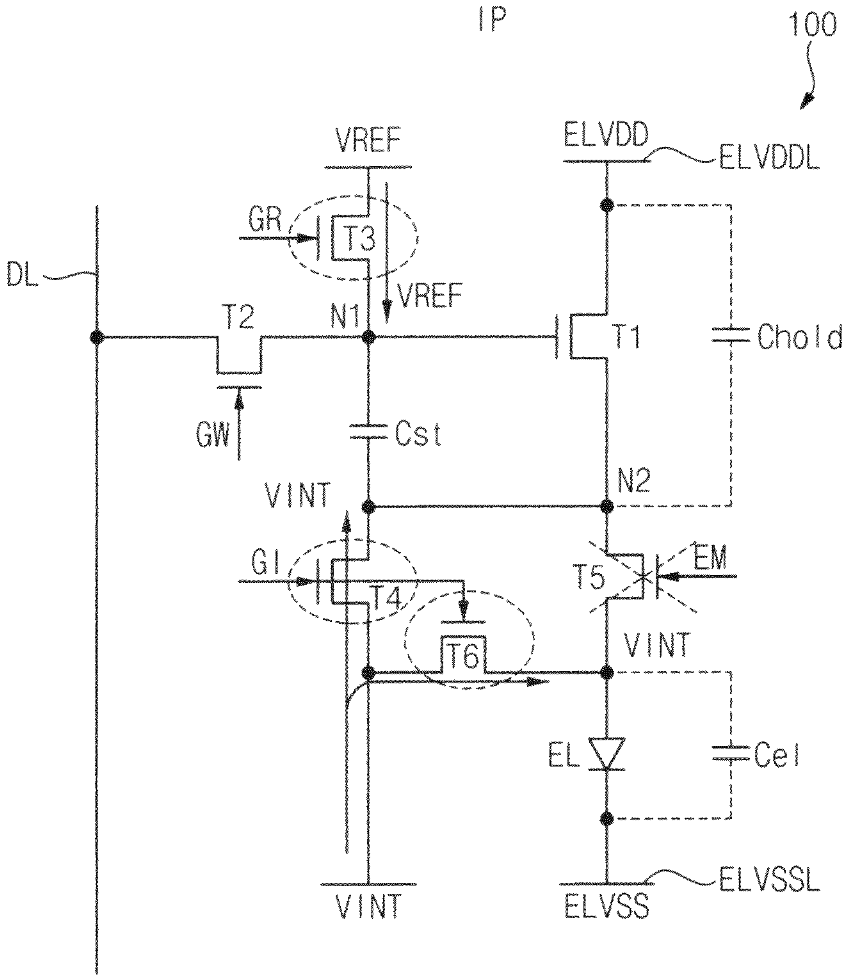
FIG. 4 is a circuit diagram for describing an example of an operation of a pixel in an initialization period.
Figure 5:
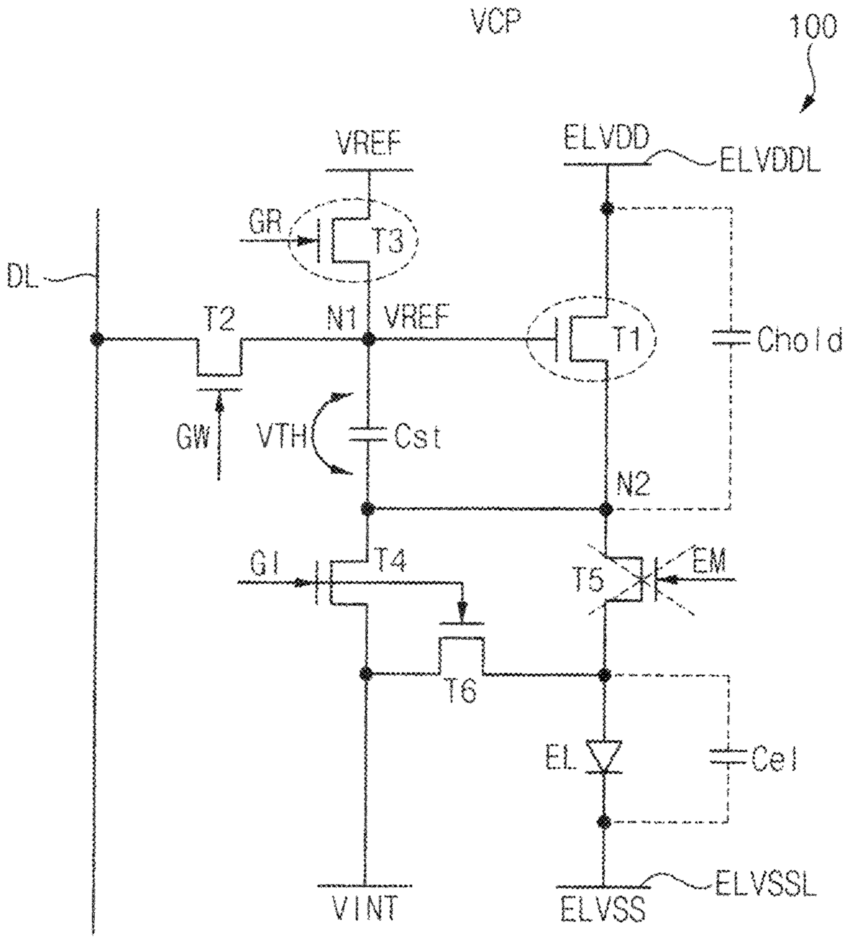
FIG. 5 is a circuit diagram for describing an example of an operation of a pixel in a threshold voltage compensation period.
Figure 6:
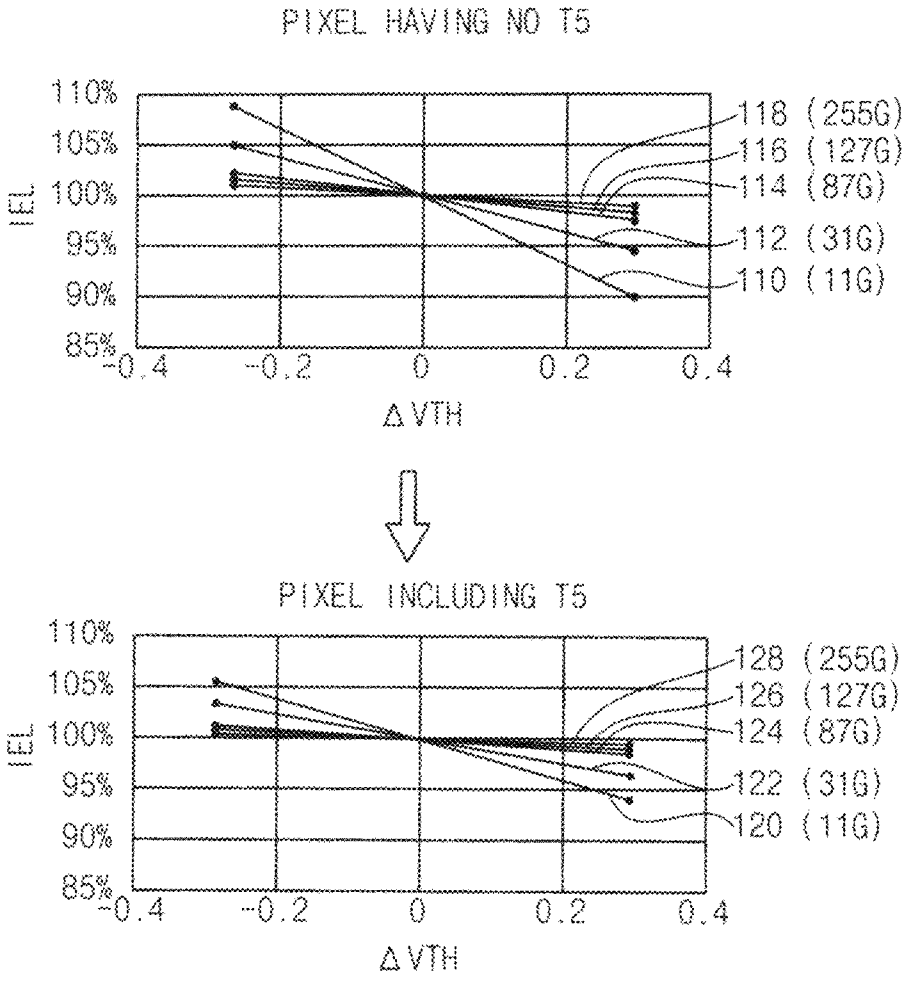
FIG. 6 is a diagram illustrating an example of a light emission current according to a threshold voltage change in a pixel having no fifth transistor, and an example of a light emission current according to a threshold voltage change in a pixel including a fifth transistor.
Figure 7:
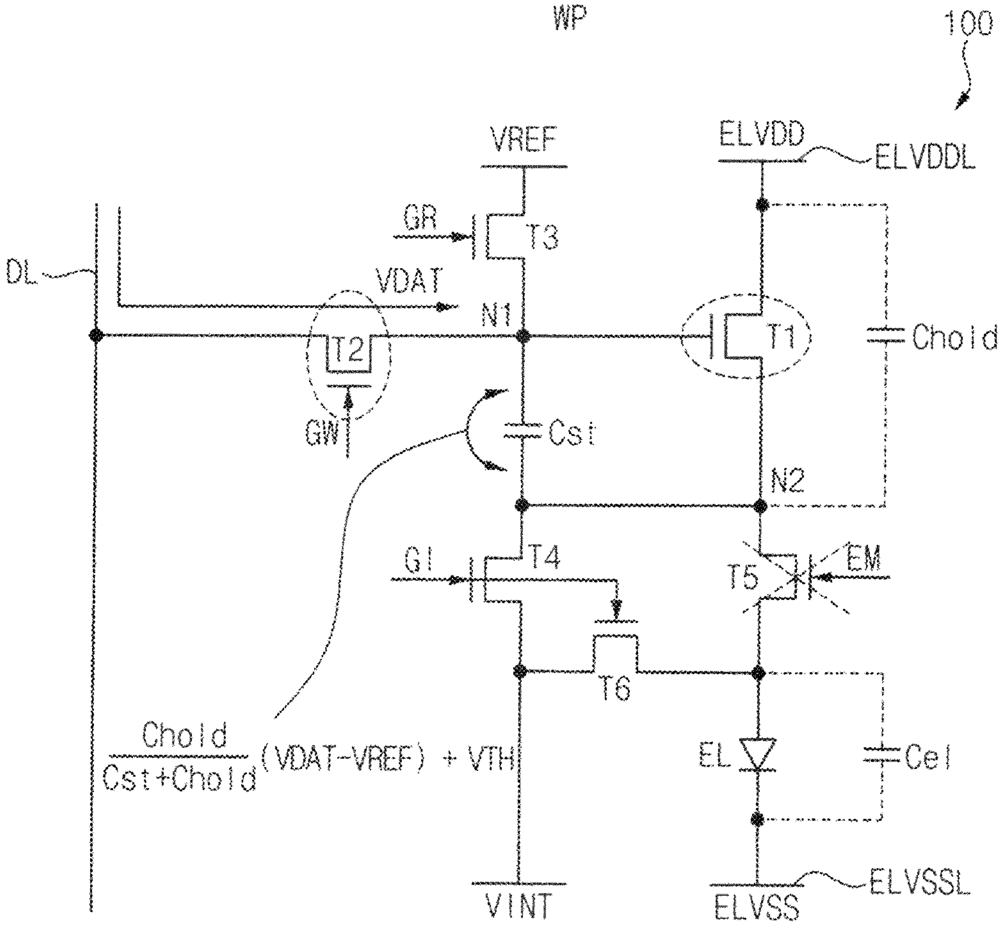
FIG. 7 is a circuit diagram for describing an example of an operation of a pixel in a data writing period.
Figure 9:
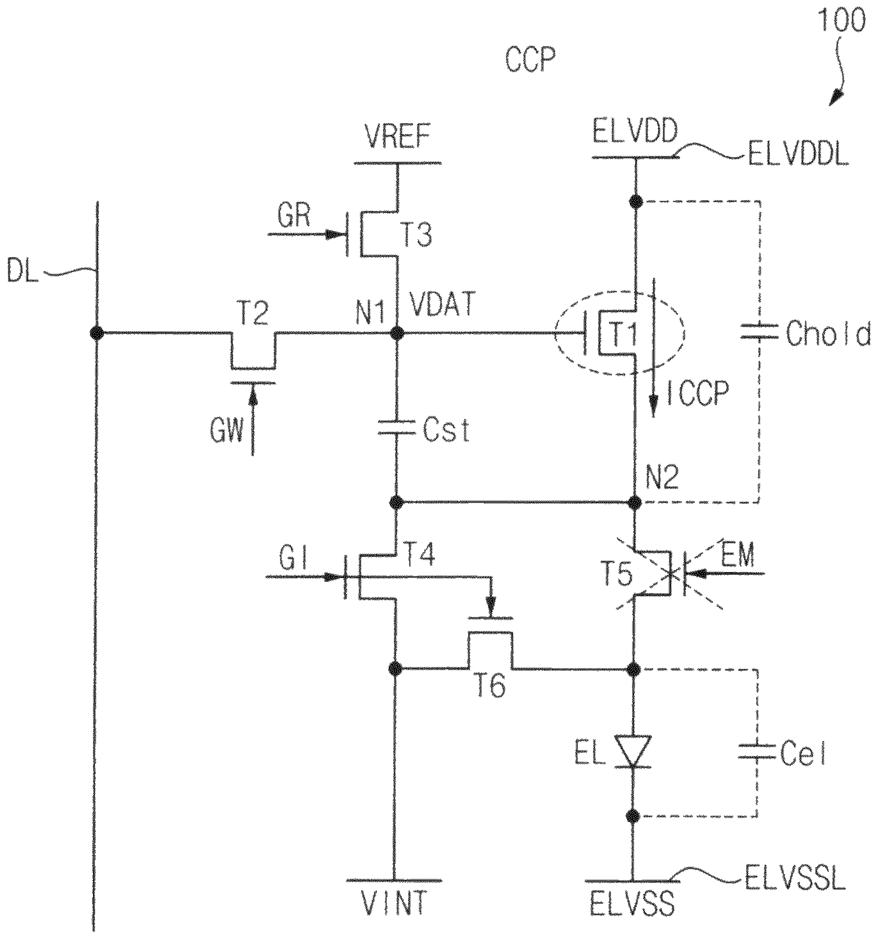
FIG. 9 is a circuit diagram for describing an example of an operation of a pixel in a current characteristic compensation period.
Figure 10A:
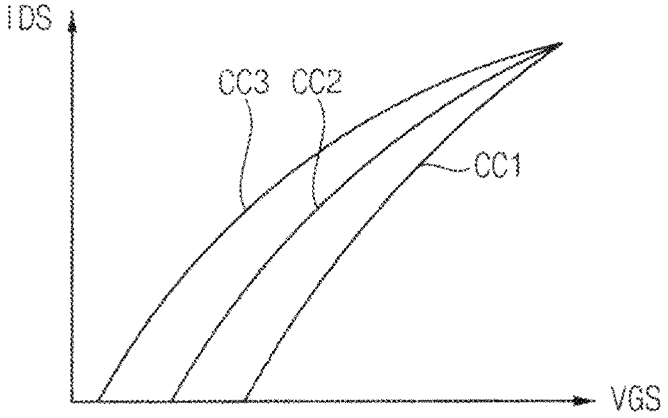
FIG. 10A is a diagram illustrating an example of current characteristics of a first transistor.
Figure 11:
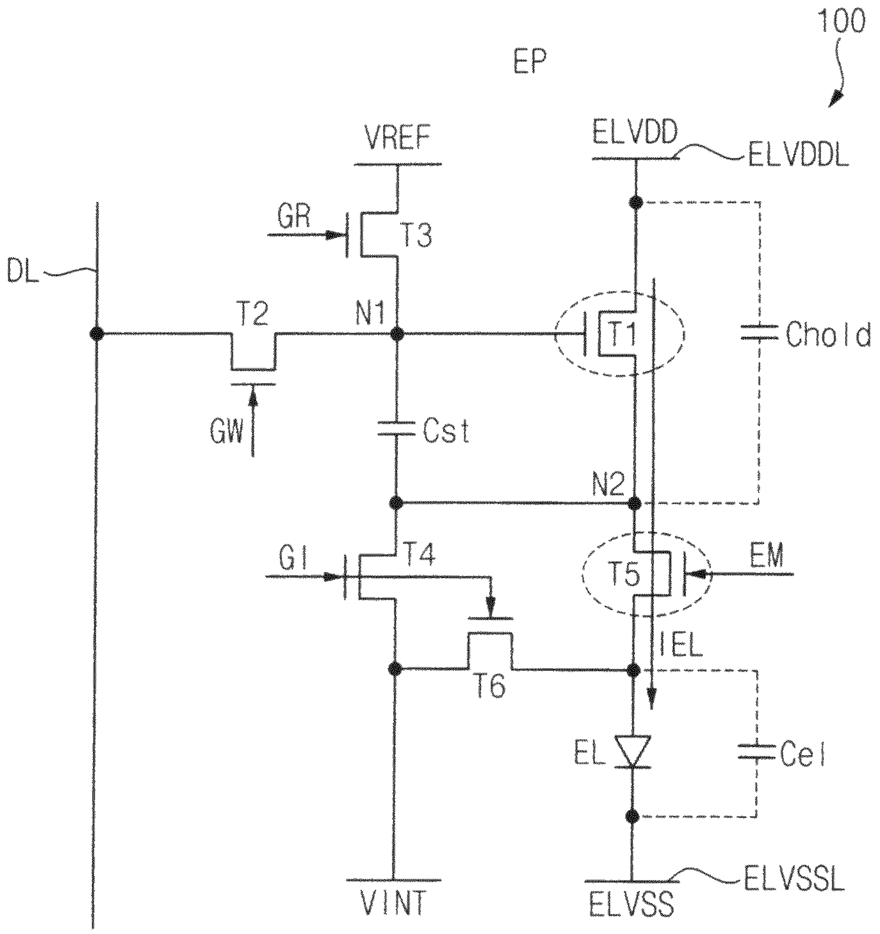
FIG. 11 is a circuit diagram for describing an example of an operation of a pixel in an emission period.

FIG. 3 is a timing diagram for describing an example of an operation of a pixel of a display device according to embodiments, FIG. 4 is a circuit diagram for describing an example of an operation of a pixel in an initialization period, FIG. 5 is a circuit diagram for describing an example of an operation of a pixel in a threshold voltage compensation period, FIG. 6 is a diagram illustrating an example of a light emission current according to a threshold voltage change in a pixel having no fifth transistor, and an example of a light emission current according to a threshold voltage change in a pixel including a fifth transistor, FIG. 7 is a circuit diagram for describing an example of an operation of a pixel in a data writing period, FIG. 8 is a diagram illustrating an example of a light emission current according to a capacitance change of a parasitic capacitor of a light emitting element in a pixel having no fifth transistor, and an example of a light emission current according to a capacitance change of a parasitic capacitor of a light emitting element in a pixel including a fifth transistor, FIG. 9 is a circuit diagram for describing an example of an operation of a pixel in a current characteristic compensation period, FIG. 10A is a diagram illustrating an example of current characteristics of a first transistor, FIG. 10B is a diagram for describing an example of light emission currents of a pixel having no fifth transistor and a pixel including a fifth transistor according to the current characteristics of the first transistor, and FIG. 11 is a circuit diagram for describing an example of an operation of a pixel in an emission period.

Referring to FIGS. 2 and 3, each frame period FP for a pixel 100 may include an initialization period IP in which a first node N1 and a second node N2 are initialized, a threshold voltage compensation period VCP in which a threshold voltage VTH of a first transistor T1 is stored in a first capacitor Cst, a data writing period WP in which a data voltage provided from a data line DL is transferred to the first node N1, a current characteristic compensation period CCP in which a change of a current characteristic of the first transistor T1 is compensated, and an emission period EP in which a light emitting element EL emits light. In some embodiments, as illustrated in FIG. 3, the data writing period WP may overlap the current characteristic compensation period CCP.

In the initialization period IP, a second signal GR and a third signal GI may have an active level (e.g., a high level), and a first signal GW and a fourth signal EM and may have an inactive level (e.g., a low level). As illustrated in FIG. 4, a third transistor T3 may be turned on in response to the second signal GR having the active level to apply a reference voltage VREF to the first node N1, and a fourth transistor T4 may be turned on in response to the third signal GI having the active level to apply an initialization voltage VINT to the second node N2. Accordingly, the first node N1 may be initialized based on the reference voltage VREF, and the second node N2 may be initialized based on the initialization voltage VINT. In some embodiments, a sixth transistor T6 may transfer the initialization voltage VINT to an anode of the light emitting element EL in response to the third signal GI having the active level. Accordingly, the anode of the light emitting element EL may be initialized based on the initialization voltage VINT. Further, during the initialization period IP, a fifth transistor T5 may be turned off in response to the fourth signal EM having the inactive level to separate the second node N2 from the anode of the light emitting element EL.

In the threshold voltage compensation period VCP, the second signal GR may have the active level, and the first signal GW, the third signal GI and the fourth signal EM may have the inactive level. As illustrated in FIG. 5, the third transistor T3 may be turned on in response to the second signal GR having the active level to continue applying the reference voltage VREF to the first node N1. A first terminal (e.g., a drain) of the first transistor T1 may receive a first power supply voltage ELVDD, a gate of the first transistor T1 may receive the reference voltage VREF, and the first transistor T1 may operate as a source follower to change a voltage of the second node N2 coupled to a second terminal (e.g., a source) of the first transistor T1 to a voltage level close to the reference voltage VREF at the first node N1. Thus, until the threshold voltage VTH of the first transistor T1 is stored in the first capacitor Cst, or until the voltage of the second node N2 becomes a voltage corresponding to the threshold voltage VTH subtracted from the reference voltage VREF, the first transistor T1 may be turned on to provide a current to the second node N2.

Further, in the threshold voltage compensation period VCP, the fifth transistor T5 may be turned off in response to the fourth signal EM having the inactive level to separate the second node N2 from the anode of the light emitting element EL. Thus, in the pixel 100 according to embodiments, the second node N2 may be separated or disconnected from the anode of the light emitting element EL during the threshold voltage compensation period VCP, and the voltage of the second node N2 may not be affected by a parasitic capacitor Cel of the light emitting element EL. Accordingly, compared with a pixel having no fifth transistor T5, or a pixel where a second node (e.g., a source node of a driving transistor) is coupled or connected to an anode of a light emitting element during the threshold voltage compensation period VCP, the pixel 100 according to embodiments may rapidly and accurately compensate for the threshold voltage VTH of the first transistor T1.

In an embodiment, for example, as illustrated in FIG. 6, in a case where the threshold voltage of the driving transistor of the pixel having no fifth transistor T5 is changed in a range from about −0.3 voltages (V) to about +0.3 V, a light emission current IEL provided to the light emitting element may be changed by a range from about +10% (i.e., changed % with respect to 100%) to about −10% as illustrated as a first graph 110 when the pixel displays an image of a 11-gray level 11G, may be changed by a range from about +5% to about −6% as illustrated as a second graph 112 when the pixel displays an image of a 31-gray level 31G, may be changed by a range from about +2.5% to about −2.5% as illustrated as a third graph 114 when the pixel displays an image of a 87-gray level 87G, may be changed by a range from about +2% to about −2% as illustrated as a fourth graph 116 when the pixel displays an image of a 127-gray level 127G, and may be changed by a range from about +1% to about −1% as illustrated as a fifth graph 118 when the pixel displays an image of a 255-gray level 255G. However, in a case where the threshold voltage VTH of the first transistor T1 of the pixel 100 including the fifth transistor T5 is changed in the range from about −0.3 V to about +0.3 V, a light emission current IEL provided to the light emitting element EL may be changed by a range from about +6% to about −6% as illustrated as a sixth graph 120 when the pixel 100 displays the image of the 11-gray level 11G, may be changed by a range from about +4% to about-4% as illustrated as a seventh graph 122 when the pixel 100 displays the image of the 31-gray level 31G, may be changed by a range from about +1% to about −1% as illustrated as an eighth graph 124 when the pixel 100 displays the image of the 87-gray level 87G, may be changed by a range from about +0.5% to about −0.5% as illustrated as a ninth graph 126 when the pixel 100 displays the image of the 127-gray level 127G, and may be changed by a range from about +0.3% to about −0.3% as illustrated as a tenth graph 128 when the pixel 100 displays the image of the 255-gray level 255G. As described above, compared with the pixel having no fifth transistor T5, the pixel 100 may rapidly and accurately compensate for the threshold voltage VTH of the first transistor T1, and an error of the light emission current IEL of the pixel 100 may be reduced.

In the data writing period WP, the first signal GW may have the active level, and the second signal GR, the third signal GI and the fourth signal EM may have the inactive level. As illustrated in FIG. 7, in the data writing period WP, a second transistor T2 may be turned on in response to the first signal GW having the active level to apply the data voltage VDAT to the first node N1. Further, during the data writing period WP, the fifth transistor T5 may be turned off in response to the fourth signal EM having the inactive level to separate the second node N2 from the anode of the light emitting element EL. Thus, in the pixel 100 according to embodiments, the second node N2 may be separated or disconnected from the anode of the light emitting element EL during the data writing period WP, and the voltage of the second node N2 and a voltage stored between first and second electrodes of the first capacitor Cst may not (or almost not) be affected by the parasitic capacitor Cel of the light emitting element EL. For example, by the data voltage VDAT transferred by the second transistor T2, a voltage of the first node N1, or a voltage of the first electrode of the first capacitor Cst may be changed by "Δ(VDAT−VREF)" from the voltage VREF to the data voltage VDAT. If the voltage of the first node N1 is changed by "Δ(VDAT−VREF)", the voltage of the second node N2, or a voltage of the second electrode of the first capacitor Cst may be changed by "Cst/(Cst+Chold)*(VDAT−VREF)" based a voltage change of the first node N1 and values of the first and second capacitors Cst and Chold coupled to the first node N1. Here, "Cst" and "Chold" in equations correspond to the value of the first capacitor Cst and the value of the second capacitor Chold, respectively. Accordingly, the voltage stored between the first and second electrodes of the first capacitor Cst, or a gate-source voltage of the first transistor T1 may become $$\text{“}\frac{Chold}{Cst+Chold}(VDAT-VREF)+VTH\text{”}.$$

As described above, in the pixel 100 according to embodiments, since the voltage stored in the first capacitor Cst, or the gate-source voltage of the first transistor T1 is not (or almost not) affected by the parasitic capacitor Cel of the light emitting element EL, the light emission current IEL of the light emitting element EL may not be substantially changed in spite of a change of the parasitic capacitor Cel of the light emitting element EL, or a change of the light emission current IEL may be reduced compared with the pixel having no fifth transistor T5.

In an embodiment, for example, as illustrated in FIG. 8, in the pixel having no fifth transistor T5, or the pixel where the source node of the driving transistor is coupled to the anode of the light emitting element during the data writing period WP, the light emission current IEL generated by the driving transistor may be determined by an equation 130, or $$\text{“}IEL = K\left[\frac{\text{Chold}+Cel}{Cst+\text{Chold}+Cel}(\text{V}DAT-\text{V}REF)\right]^2\text{”},$$

where K is a current coefficient, and Here, “Cel” in equations correspond to the value of the parasitic capacitor Cel. Thus, in the pixel having no fifth transistor T5, in a case where a capacitance of the parasitic capacitor Cel of the light emitting element is changed from about $5*10^{-13}$ F to about $7*10^{-13}$ F, the light emission current IEL provided to the light emitting element may be changed from about $4.48*10^{-10}$ A to about $14.43*10^{-10}$ A, and luminance of the light emitting element may be undesirably increased. However, in the pixel 100 including the fifth transistor T5 according to embodiments, the light emission current IEL generated by the first transistor T1 may be determined by an equation 140, or $$\text{“}IEL = K\left[\frac{\text{Chold}}{Cst+\text{Chold}}(\text{V}DAT-\text{V}REF)\right]^2\text{”},$$

and may not (or almost not) be affected by the parasitic capacitor Cel of the light emitting element EL. Accordingly, in the pixel 100 according to embodiments, even if the capacitance of the parasitic capacitor Cel of the light emitting element EL is changed from about $5*10^{-13}$ F to about $7*10^{-13}$ F, the light emission current IEL provided to the light emitting element EL may be changed from about $4.74*10^{-10}$ A to about $4.85*10^{-10}$ A, and luminance of the light emitting element EL may be substantially uniform.

In some embodiments, as illustrated in FIG. 3, the data writing period WP may overlap the current characteristic compensation period CCP. During the data writing period WP, the gate of the first transistor T1 may receive the data voltage VDAT, the first terminal (e.g., the drain) of the first transistor T1 may receive the first power supply voltage ELVDD, and thus the first transistor T1 may be turned on. Accordingly, during the data writing period WP, the first transistor T1 may provide a current to the second node N2, and the voltage of the second node N2 may be changed by the current of the first transistor T1 to compensate for the change of the current characteristic of the first transistor T1. This current characteristic change compensation operation will be described below with reference to FIGS. 10A and 10B.

In the current characteristic compensation period CCP, the second signal GR, the third signal TI and the fourth signal EM have the inactive level. As illustrated in FIG. 9, during the current characteristic compensation period CCP, the fifth transistor T5 may be turned off in response to the fourth signal EM having the inactive level to separate the second node N2 from the anode of the light emitting element EL. Further, in the current characteristic compensation period CCP, the first terminal (e.g., the drain) of the first transistor T1 may receive the first power supply voltage ELVDD, the gate of the first transistor T1 may receive the data voltage VDAT, and the first transistor T1 may be turned on to apply a compensation current ICCP to the second node N2. Accordingly, the first transistor T1 may perform the current characteristic change compensation operation that compensates for the change of the current characteristic of the first transistor T1. For example, in a case where the current characteristic of the first transistor T1 is changed such that the light emission current IEL in the emission period EP is increased, or in a case where a mobility of the first transistor T1 is increased, the compensation current ICCP of the first transistor T1 in the current characteristic compensation period CCP may be increased by the change of the current characteristic of the first transistor T1, the voltage of the second node N2 may be increased by the increase of the compensation current ICCP of the first transistor T1, the gate-source voltage of the first transistor T1 may be decreased by the increase of the voltage of the second node N2, and the light emission current IEL of the first transistor T1 in the emission period EP may be decreased by the decrease of the gate-source voltage of the first transistor T1. In another example, in a case where the current characteristic of the first transistor T1 is changed such that the light emission current IEL in the emission period EP is decreased, or in a case where the mobility of the first transistor T1 is decreased, the compensation current ICCP of the first transistor T1 in the current characteristic compensation period CCP may be decreased by the change of the current characteristic of the first transistor T1, the voltage of the second node N2 may be decreased by the decrease of the compensation current ICCP of the first transistor T1, the gate-source voltage of the first transistor T1 may be increased by the decrease of the voltage of the second node N2, and the light emission current IEL of the first transistor T1 in the emission period EP may be increased by the increase of the gate-source voltage of the first transistor T1. As described above, even if the current characteristic or the mobility of the first transistor T1 is changed, the light emission current IEL provided to the light emitting element EL in the emission period EP may be substantially uniform, or the change of the light emission current IEL may be reduced.

In an embodiment, for example, as illustrated in FIGS. 10A and 10B, in the pixel having no fifth transistor T5, or the pixel where the driving transistor is not turned on during a period from a time point at which a data voltage is written to a time point at which the light emitting element starts to emit light, in a case where a current characteristic of the driving transistor is changed from a first current characteristic CC1 to a second current characteristic CC2, or in a case where a slope of a voltage-current curve (or a VGS-IDS curve) of the driving transistor is decreased, the light emission current IEL of the driving transistor may be increased from about $4.37*10^{-10}$ A to about $5.29*10^{-10}$ A. Here, the current IDS flowing from a drain to source of the driving transistor corresponds to the light emission current IEL. Further, in the pixel having no fifth transistor T5, in a case where the current characteristic of the driving transistor is changed from the second current characteristic CC2 to a third current characteristic CC3, or in a case where a slope of the voltage-current curve (or the VGS-IDS curve) of the driving transistor is further decreased, the light emission current IEL of the driving transistor may be increased from about $5.29*10^{-10}$ A to about $6.18*10^{-10}$ A. However, in the pixel 100 where the first transistor T1 is turned on during the current characteristic compensation period CCP, in the case where the current characteristic of the first transistor T1 is changed from the first current characteristic CC1 to the second current characteristic CC2, the compensation current ICCP of the first transistor T1 may be increased from about $1.56*10^{-9}$ A to about $1.59*10^{-9}$ A, and the voltage of the second node N2 may be increased from about 2.2076 V to about 2.2101 V. Accordingly, an increase amount of the light emission current IEL in the emission period EP may be about $0.41*10^{-10}$ A, and may be reduced compared with an increase amount of about $0.92*10^{-10}$ in the pixel having no fifth transistor T5. Further, in the case where the current characteristic of the first transistor T1 is changed from the second current characteristic CC2 to the third current characteristic CC3, the compensation current ICCP of the first transistor T1 may be increased from about $1.59*10^{-9}$ A to about $1.63*10^{-9}$ A, and the voltage of the second node N2 may be increased from about 2.2101 V to about 2.2139 V. Accordingly, the increase amount of the light emission current IEL in the emission period EP may be about $0.44*10^{-10}$ A, and may be reduced compared with an increase amount of about $0.89*10^{-10}$ in the pixel having no fifth transistor T5.

In the emission period EP, the fourth signal EM may have the active level, and the first signal GW, the second signal GR and the third signal GI may have the inactive level. As illustrated in FIG. 11, the fifth transistor T5 may be turned on in response to the fourth signal EM having the active level to couple or connect the second node N2 to the anode of the light emitting element EL. Further, the first transistor T1 may be turned on based on the voltage stored between the first and second electrodes of the first capacitor Cst to provide the light emission current IEL to the light emitting element EL. The light emitting element EL may emit light based on the light emission current IEL.

Figure 12A:
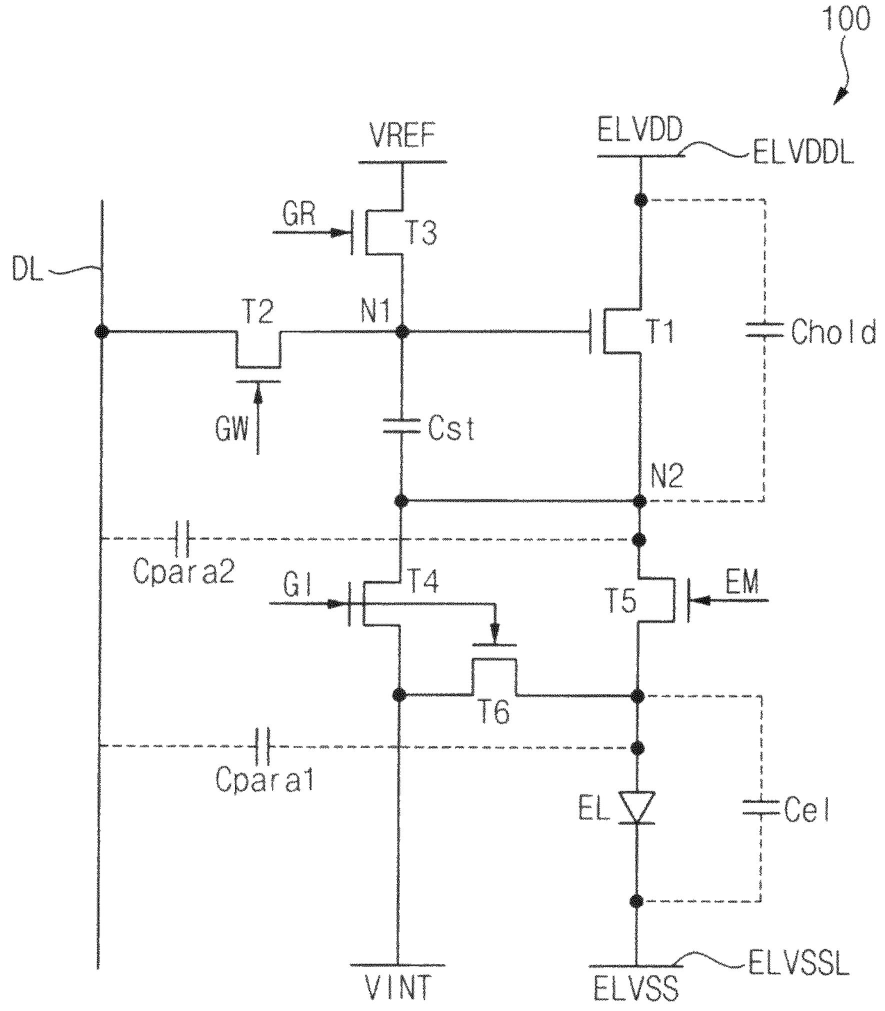
FIG. 12A is a circuit diagram illustrating an example of a pixel including a first parasitic capacitor and a second parasitic capacitor.
Figure 12B:
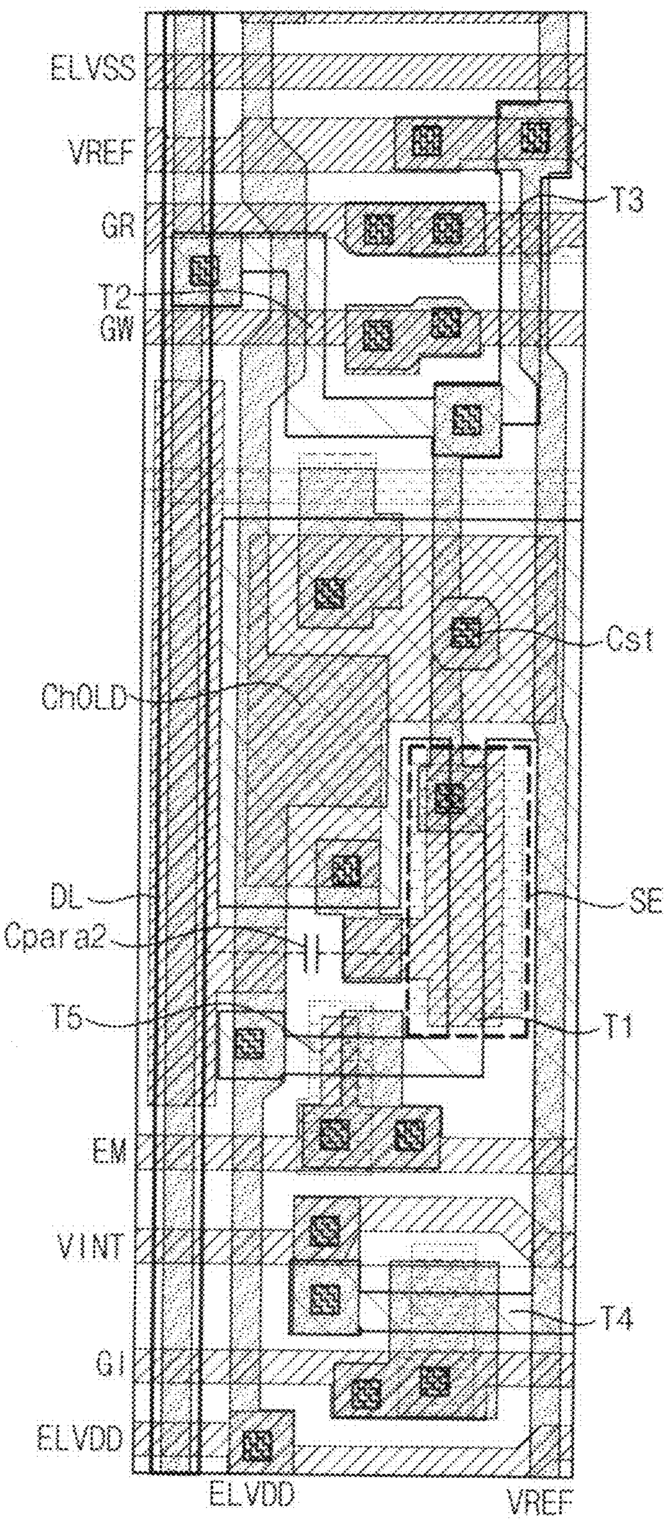
FIG. 12B is a diagram illustrating an example of a pixel layout where a data line and an electrode of a second terminal of a first transistor do not overlap each other.

FIG. 12A is a circuit diagram illustrating an example of a pixel including a first parasitic capacitor and a second parasitic capacitor, and FIG. 12B is a diagram illustrating an example of a pixel layout where a data line and an electrode of a second terminal of a first transistor do not overlap each other.

As illustrated in FIG. 12A, a pixel 100 according to embodiments may have a first parasitic capacitor Cpara1 between an anode of a light emitting element EL and a data line DL. Further, in a case where a voltage of the data line DL is changed, a voltage of the anode of the light emitting element EL may also be changed by the first parasitic capacitor Cpara1. However, in the pixel 100 according to embodiments, a second node N2 may be separated or disconnected from the anode of the light emitting element EL by a fifth transistor T5 during a threshold voltage compensation period VCP and a data writing period, and thus a voltage of the second node N2 may not be affected by the voltage change of the anode of the light emitting element EL caused by the first parasitic capacitor Cpara1.

However, in the case where the voltage of the data line DL is changed, the voltage of the second node N2 may be changed by a second parasitic capacitor Cpara2 between the second node N2 and the data line DL. In the pixel 100 according to embodiments, a capacitance of the second parasitic capacitor Cpara2 may be much less than a capacitance of the first parasitic capacitor Cpara1. In some embodiments, as illustrated in FIG. 12B, the data line DL may not overlap a second terminal electrode SE (e.g., a source electrode) of the first transistor T1 in a plan view. That is, in the pixel 100 according to embodiments, the second terminal electrode SE of the first transistor T1 may not be disposed above the data line DL, the data line DL may not be disposed above the second terminal electrode SE of the first transistor T1, and the data line DL and the second terminal electrode SE of the first transistor T1 may be spaced apart from each other. Accordingly, the capacitance of the second parasitic capacitor Cpara2 between the second node N2 and the data line DL may be less than the capacitance of the first parasitic capacitor Cpara1 between the anode of the light emitting element EL and the data line DL, and thus the change of the voltage of the second node2 by the voltage change of the data line DL may be reduced or minimized.

FIG. 13 is a circuit diagram illustrating a pixel of a display device according to embodiments.

Referring to FIG. 13, a pixel 150 according to embodiments may include a first capacitor Cst, a second capacitor Chold, a first transistor T1, a second transistor T2, a third transistor T3, a fourth transistor T4, a fifth transistor PT5, a sixth transistor T6 and a light emitting element EL. The pixel 150 of FIG. 13 may have a similar configuration and a similar operation to a pixel 100 of FIG. 2, except that the fifth transistor PT5 is implemented with a PMOS transistor.

In the pixel 150 of FIG. 13, the fifth transistor PT5 that is turned on during most of each frame period may be implemented with, but not limited to, an LTPS PMOS transistor having a relatively high reliability. The fifth transistor PT5 may receive a signal EMB that is inverted from a fourth signal EM illustrated in FIG. 3.

Although FIG. 13 illustrates an example where the fifth transistor PT5 is implemented with the PMOS transistor and other transistors T1, T2, T3, T4 and T6 are implemented with NMOS transistors, in other embodiments, the fifth transistor PT5 may be implemented with the NMOS transistor, or a portion or all of the other transistors T1, T2, T3, T4 and T6 may be implemented with the PMOS transistors. For example, not only the fifth transistor PT5, but also at least one of the second, third, fourth and sixth transistors T2, T3, T4 and T6 may be implemented with the PMOS transistor.

Figure 14:
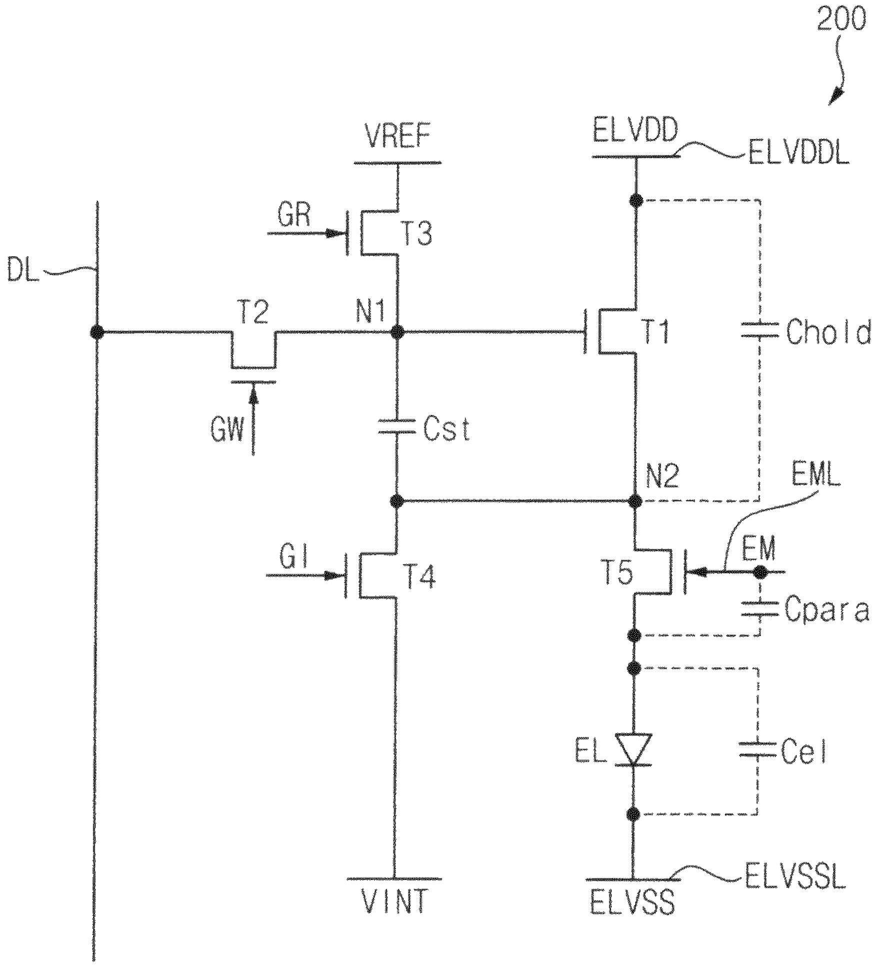
FIG. 14 is a circuit diagram illustrating a pixel of a display device according to embodiments.

FIG. 14 is a circuit diagram illustrating a pixel of a display device according to embodiments.

Referring to FIG. 14, a pixel 200 according to embodiments may include a first capacitor Cst, a second capacitor Chold, a first transistor T1, a second transistor T2, a third transistor T3, a fourth transistor T4, a fifth transistor T5 and a light emitting element EL. The pixel 200 of FIG. 14 may have a similar configuration and a similar operation to a pixel 100 of FIG. 2, except that the pixel 200 may not have a sixth transistor T6 that is an anode initialization transistor.

The sixth transistor T6 of the pixel 100 of FIG. 2 may act to decrease a voltage of an anode of the light emitting element EL to an initialization voltage VINT. However, although the pixel 200 does not have the sixth transistor T6, when a fourth signal EM is decreased from a high level to a low level at a start time point of an initialization period, the voltage of the anode of the light emitting element EL may also be decreased by a parasitic capacitor Cpara between the anode of the light emitting element EL and a fourth signal line EML. Accordingly, although the pixel 200 does not have the sixth transistor T6, the pixel 200 may normally operate.

Figure 15:
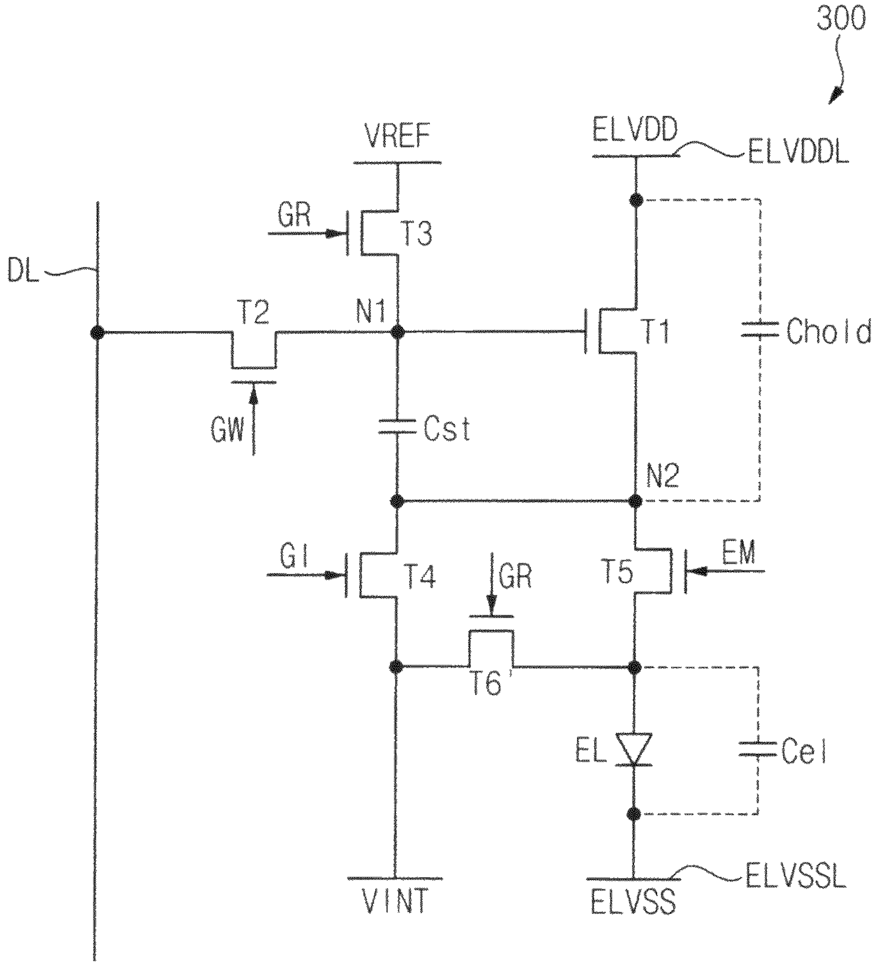
FIG. 15 is a circuit diagram illustrating a pixel of a display device according to embodiments.

FIG. 15 is a circuit diagram illustrating a pixel of a display device according to embodiments.

Referring to FIG. 15, a pixel 300 according to embodiments may include a first capacitor Cst, a second capacitor Chold, a first transistor T1, a second transistor T2, a third transistor T3, a fourth transistor T4, a fifth transistor T5, a sixth transistor T6' and a light emitting element EL. The pixel 300 of FIG. 15 may have a similar configuration and a similar operation to a pixel 100 of FIG. 2, except that the sixth transistor T6' may receive a second signal GR instead of a third signal GI.

The sixth transistor T6' may transfer an initialization voltage VINT to an anode of the light emitting element EL in response to the second signal GR. In some embodiments, the sixth transistor T6' may include a gate for receiving the second signal GR, a first terminal coupled to the anode of the light emitting element EL, and a second terminal for receiving the initialization voltage VINT. As illustrated in FIG. 3, the second signal GR may have an active level during an initialization period IP and a threshold voltage compensation period VCP. Accordingly, the sixth transistor T6' may be turned on in response to the second signal GR having the active level during the initialization period IP and the threshold voltage compensation period VCP, and thus the anode of the light emitting element EL may be sufficiently initialized.

Figure 16:
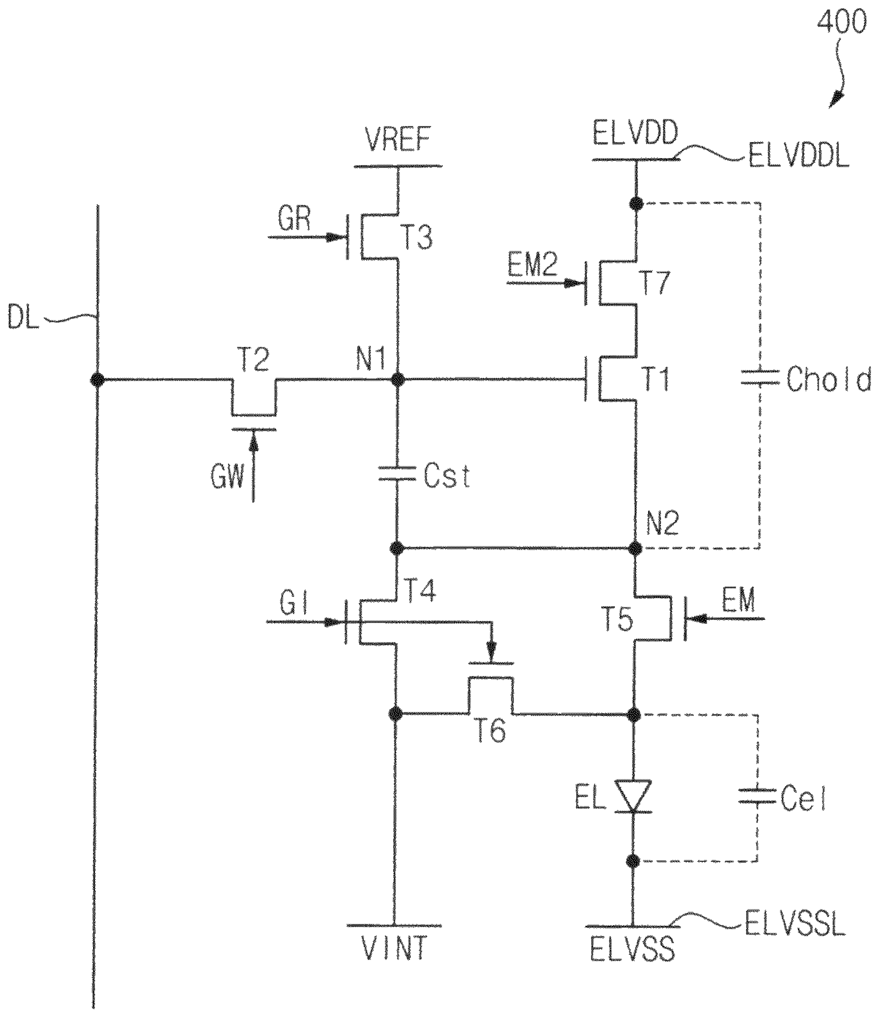
FIG. 16 is a circuit diagram illustrating a pixel of a display device according to embodiments.
Figure 17:
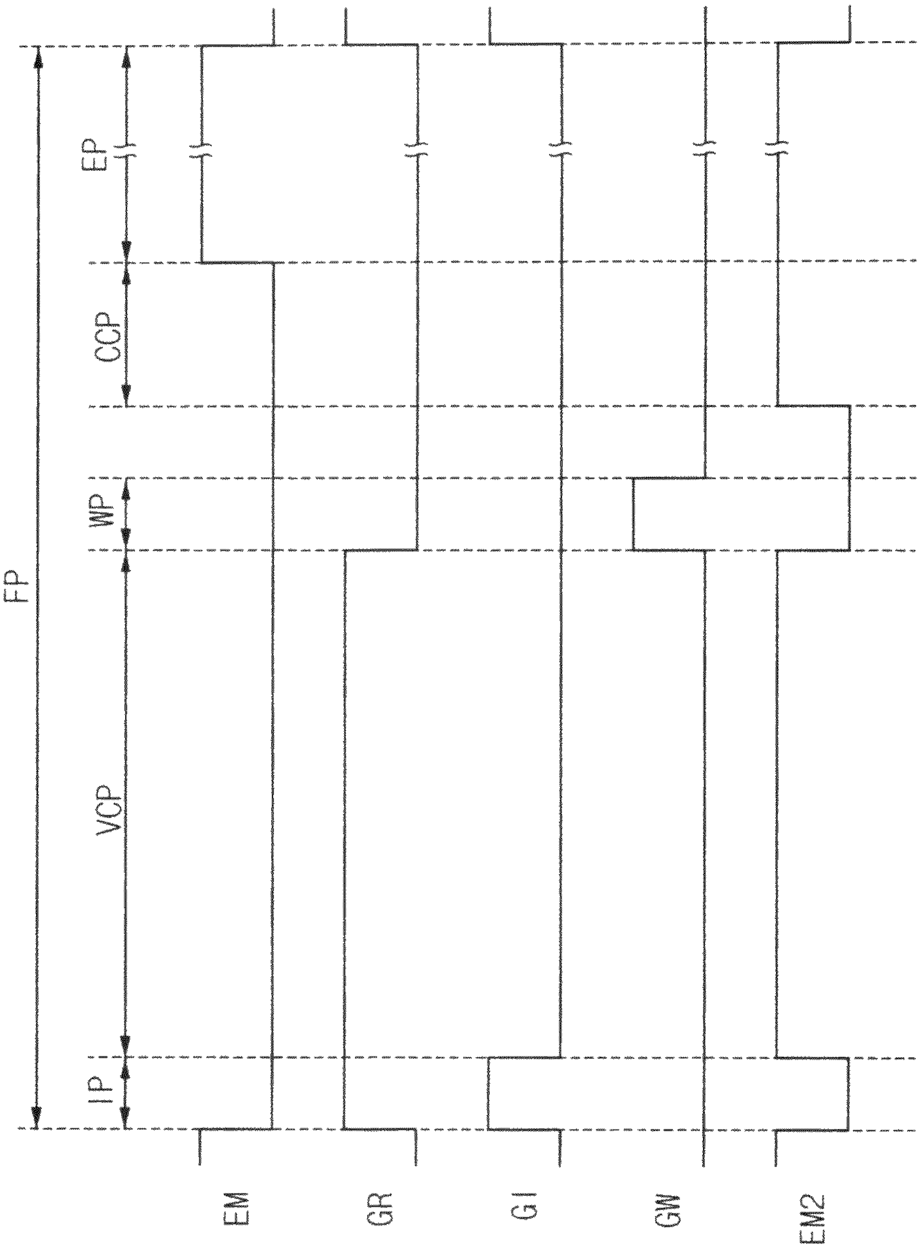
FIG. 17 is a timing diagram for describing an example of an operation of a pixel of a display device according to embodiments.

FIG. 16 is a circuit diagram illustrating a pixel of a display device according to embodiments, and FIG. 17 is a timing diagram for describing an example of an operation of a pixel of a display device according to embodiments.

Referring to FIG. 16, a pixel 400 according to embodiments may include a first capacitor Cst, a second capacitor Chold, a first transistor T1, a second transistor T2, a third transistor T3, a fourth transistor T4, a fifth transistor T5, a sixth transistor T6, a seventh transistor T7 and a light emitting element EL. The pixel 400 of FIG. 16 may have a similar configuration and a similar operation to a pixel 100 of FIG. 2, except that the pixel 400 may further include the seventh transistor T7 disposed between a first power supply voltage line ELVDDL and a first terminal of the first transistor T1.

The seventh transistor T7 may selectively couple the first terminal (e.g., a drain) of the first transistor T1 to the first power supply voltage line ELVDDL in response to a fifth signal EM2. In some embodiments, the seventh transistor T7 may include a gate for receiving the fifth signal EM2, a first terminal coupled to the first power supply voltage line ELVDDL, and a second terminal coupled to the first terminal of the first transistor T1.

As illustrated in FIG. 17, the fifth signal EM2 may have an inactive level (e.g., a low level) in an initialization period IP, may have an active level (e.g., a high level) in a threshold voltage compensation period VCP, may have the inactive level in a data writing period WP, may have the active level in a current characteristic compensation period CCP, and may have the active level in an emission period EP. Accordingly, the seventh transistor T7 may be turned off in response to the fifth signal EM2 having the inactive level in the initialization period IP to separate the first terminal of the first transistor T1 from the first power supply voltage line ELVDDL, may be turned on in response to the fifth signal EM2 having the active level in the threshold voltage compensation period VCP to couple the first terminal of the first transistor T1 to the first power supply voltage line ELVDDL, may be turned off in response to the fifth signal EM2 having the inactive level in the data writing period WP to separate the first terminal of the first transistor T1 from the first power supply voltage line ELVDDL, may be turned on in response to the fifth signal EM2 having the active level in the current characteristic compensation period CCP to couple the first terminal of the first transistor T1 to the first power supply voltage line ELVDDL, and may be turned on in response to the fifth signal EM2 having the active level in the emission period EP to couple the first terminal of the first transistor T1 to the first power supply voltage line ELVDDL.

In some embodiments, as illustrated in FIG. 17, the data writing period WP and the current characteristic compensation period CCP may be separated from each other, and thus a time length of the current characteristic compensation period CCP may be readily adjusted. Since the fifth signal EM2 has the inactive level in the data writing period WP and has the active level in the current characteristic compensation period CCP, the seventh transistor T7 may be turned off in the data writing period WP, and may be turned on in the current characteristic compensation period CCP. Accordingly, since a first power supply voltage ELVDD is not provided to the first terminal of the first transistor T1 in the data writing period WP, and is provided to the first terminal of the first transistor T1 in the current characteristic compensation period CCP, the first transistor T1 may not be turned on in the data writing period WP, and may be turned on to perform a current characteristic change compensation operation in the current characteristic compensation period CCP.

Figure 18:
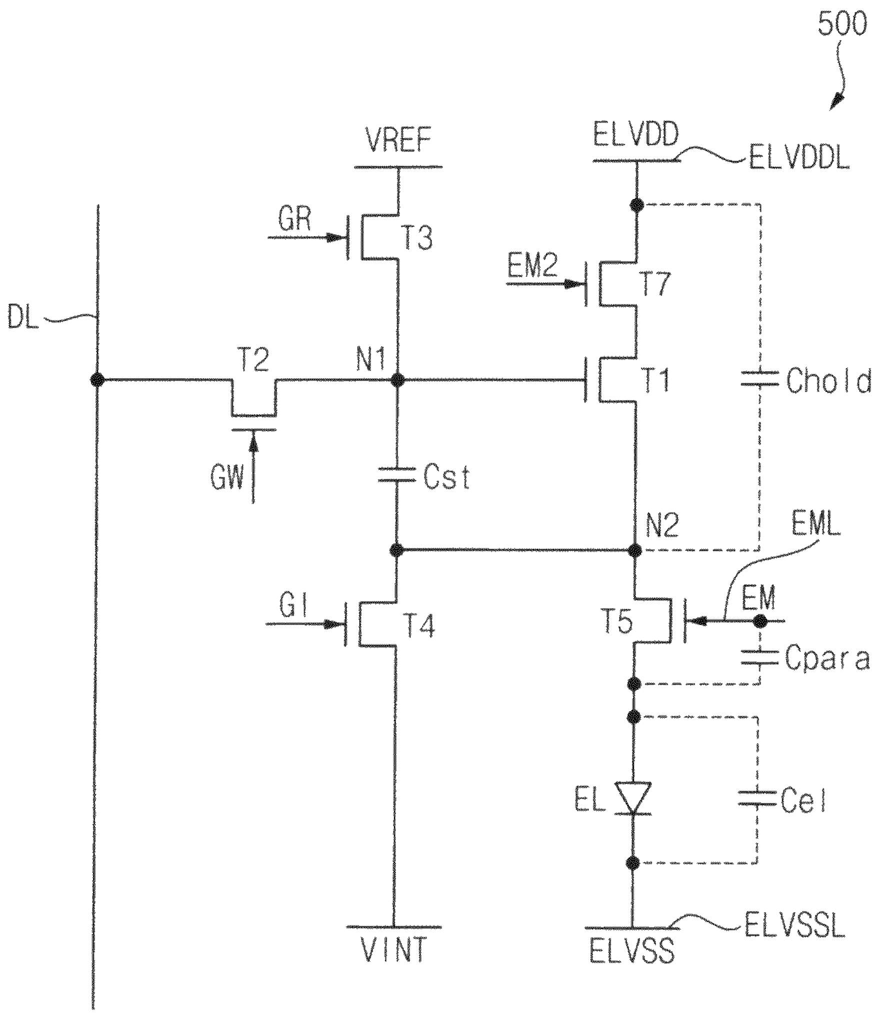
FIG. 18 is a circuit diagram illustrating a pixel of a display device according to embodiments.

FIG. 18 is a circuit diagram illustrating a pixel of a display device according to embodiments.

Referring to FIG. 18, a pixel 500 according to embodiments may include a first capacitor Cst, a second capacitor Chold, a first transistor T1, a second transistor T2, a third transistor T3, a fourth transistor T4, a fifth transistor T5, a seventh transistor T7 and a light emitting element EL. The pixel 500 of FIG. 18 may have a similar configuration and a similar operation to a pixel 400 of FIG. 16, except that the pixel 500 may not have a sixth transistor T6 that is an anode initialization transistor. Although the pixel 500 does not have the sixth transistor T6, when a fourth signal EM is decreased from a high level to a low level at a start time point of an initialization period, a voltage of an anode of the light emitting element EL may also be decreased by a parasitic capacitor Cpara between the anode of the light emitting element EL and a fourth signal line EML.

Figure 19:
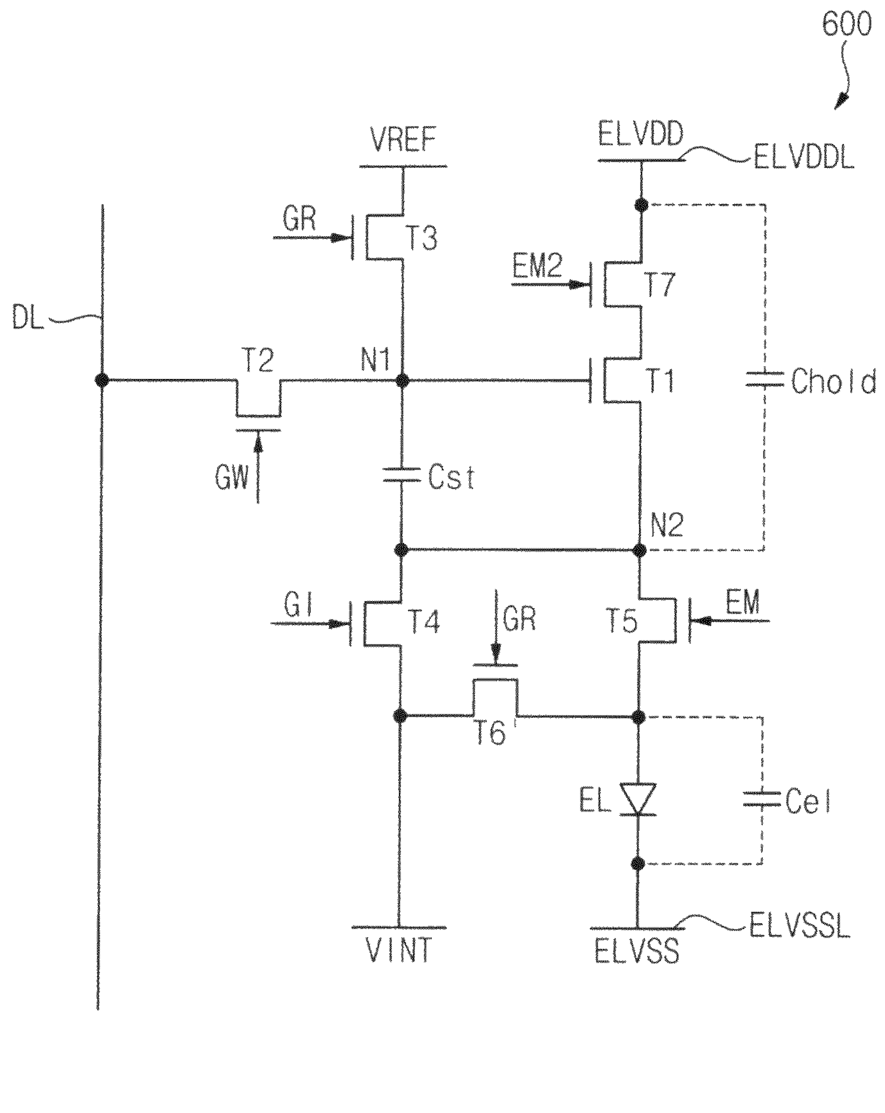
FIG. 19 is a circuit diagram illustrating a pixel of a display device according to embodiments.

FIG. 19 is a circuit diagram illustrating a pixel of a display device according to embodiments.

Referring to FIG. 19, a pixel 600 according to embodiments may include a first capacitor Cst, a second capacitor Chold, a first transistor T1, a second transistor T2, a third transistor T3, a fourth transistor T4, a fifth transistor T5, a sixth transistor T6', a seventh transistor T7 and a light emitting element EL. The pixel 600 of FIG. 19 may have a similar configuration and a similar operation to a pixel 400 of FIG. 16, except that the sixth transistor T6' may receive a second signal GR instead of a third signal GI. The sixth transistor T6' may be turned on in response to the second signal GR having an active level during an initialization period and a threshold voltage compensation period VCP, and thus an anode of the light emitting element EL may be sufficiently initialized.

Figure 20:
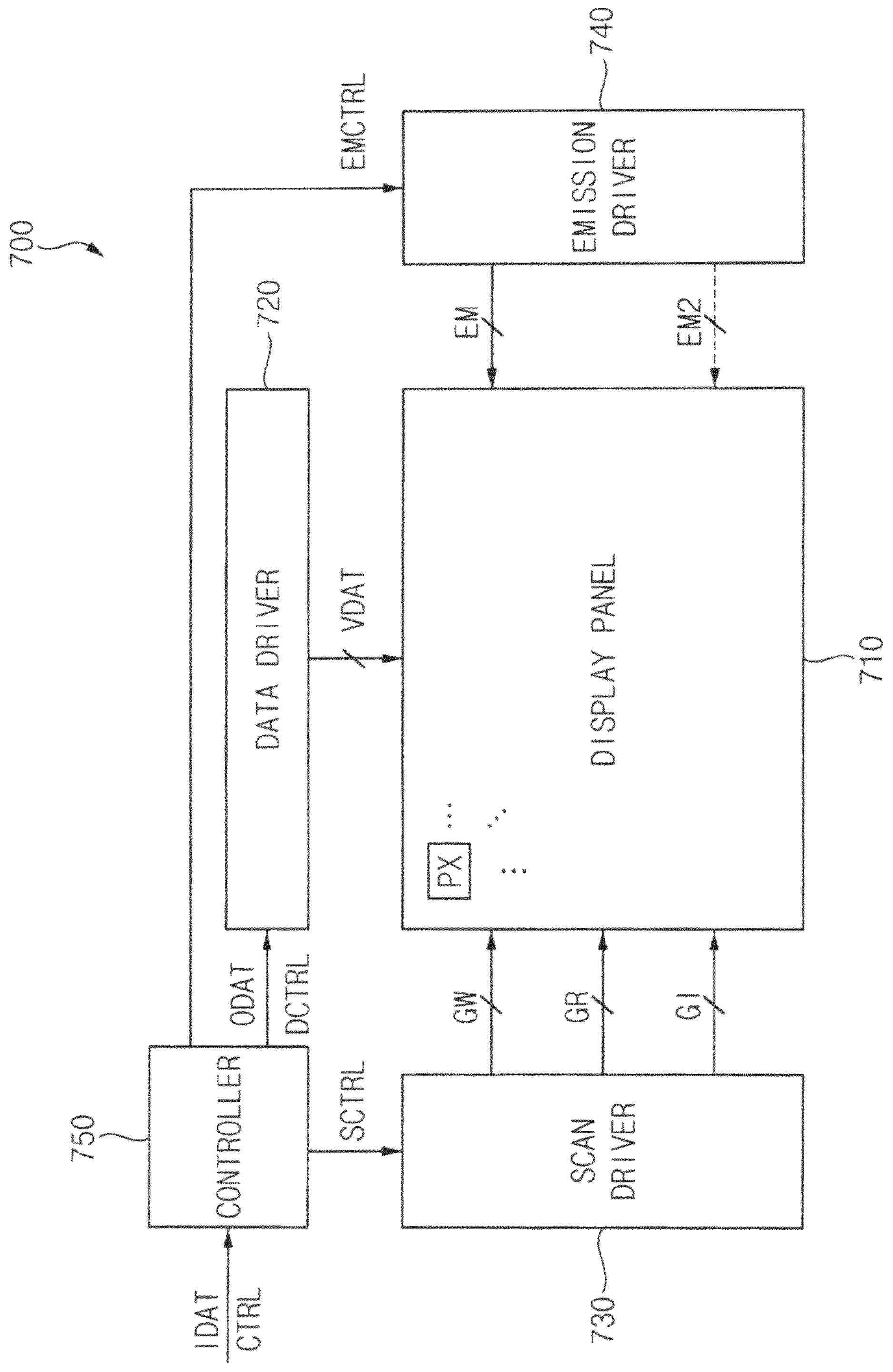
FIG. 20 is a block diagram illustrating a display device including a pixel according to embodiments.

FIG. 20 is a block diagram illustrating a display device including a pixel according to embodiments.

Referring to FIG. 20, a display device 700 according to embodiments may include a display panel 710, a data driver 720, a scan driver 730, an emission driver 740 and a controller 750.

The display panel 710 may include a plurality of pixels PX. According to embodiments, each pixel PX of the display panel 710 may be a pixel 50 of FIG. 1, a pixel 100 of FIG. 2, a pixel 150 of FIG. 13, a pixel 200 of FIG. 14, a pixel 300 of FIG. 15, a pixel 400 of FIG. 16, a pixel 500 of FIG. 18, a pixel 600 of FIG. 19, or a pixel having a similar structure.

In each pixel PX, a fifth transistor may selectively couple a second node (e.g., a source node) to an anode of a light emitting element in response to a fourth signal (e.g., an emission signal). Accordingly, a gate-source voltage of a first transistor (e.g., a driving transistor) may not be affected by a parasitic capacitor of the light emitting element, and thus the pixel PX may emit light with desired luminance. Further, the first transistor may be turned on in a current characteristic compensation period, a voltage of the second node may be changed to compensate for a change of a current characteristic of the first transistor, and thus the pixel PX may emit light with the desired luminance.

The data driver 720 may provide data voltages VDAT to the plurality of pixels PX based on output image data ODAT and a data control signal DCTRL received from the controller 750. In some embodiments, the data control signal DCTRL may include, but not limited to, an output data enable signal, a horizontal start signal and a load signal. In some embodiments, the data driver 720 and the controller 750 may be implemented with a single integrated circuit, and the single integrated circuit may be referred to as a timing controller embedded data driver ("TED") integrated circuit. In other embodiments, the data driver 720 and the controller 750 may be implemented with separate integrated circuits.

The scan driver 730 may provide first signals GW, second signals GR and third signals GI to the plurality of pixels PX based on a scan control signal SCTRL received from the controller 750. In some embodiments, the scan control signal SCTRL may include, but not limited to, a scan start signal and a scan clock signal. In some embodiments, the scan driver 730 may be integrated or formed in a peripheral portion of the display panel 710. In other embodiments, the scan driver 730 may be implemented with one or more integrated circuits.

The emission driver 740 may provide fourth signals EM and/or fifth signals EM2 to the plurality of pixels PX based on an emission control signal EMCTRL received from the controller 750. The emission control signal EMCTRL may include, but not limited to, an emission start signal and an emission clock signal. In some embodiments, the emission driver 740 may be integrated or formed in the peripheral portion of the display panel 710. In other embodiments, the emission driver 740 may be implemented with one or more integrated circuits.

The controller 750 (e.g., a timing controller) may receive input image data IDAT and a control signal CTRL from an external host processor (e.g., a graphics processing unit ("GPU"), an application processor ("AP") or a graphics card). In some embodiments, the control signal CTRL may include, but not limited to, a vertical synchronization signal, a horizontal synchronization signal, an input data enable signal, a master clock signal, etc. The controller 750 may generate the output image data ODAT, the data control signal DCTRL, the scan control signal SCTRL and the emission control signal EMCTRL based on the input image data IDAT and the control signal CTRL. The controller 750 may control an operation of the data driver 720 by providing the output image data ODAT and the data control signal DCTRL to the data driver 720, may control an operation of the scan driver 730 by providing the scan control signal SCTRL to the scan driver 730, and may control an operation of the emission driver 740 by providing the emission control signal EMCTRL to the emission driver 740.

Figure 21:
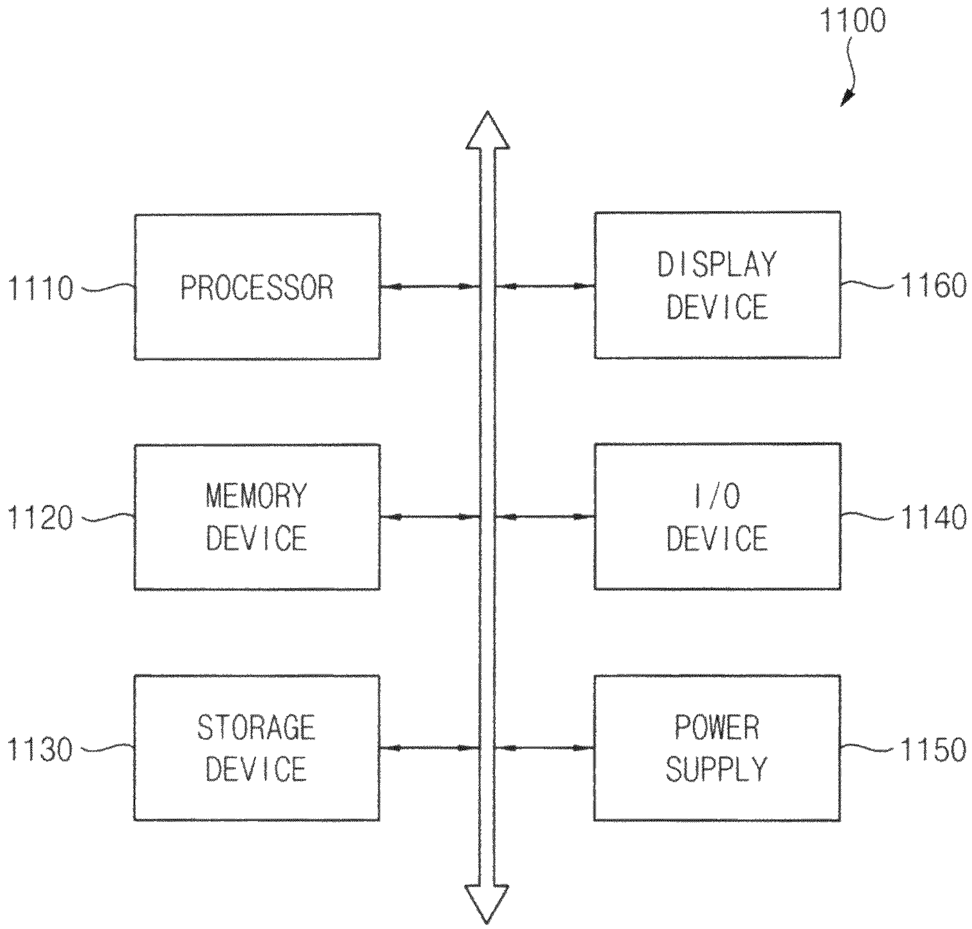
FIG. 21 is a block diagram illustrating an electronic device including a display device according to embodiments.

FIG. 21 is a block diagram illustrating an electronic device including a display device according to embodiments.

Referring to FIG. 21, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc, and/or at least one volatile memory device such as a dynamic random access memory ("DRAM") device, a static random access memory ("SRAM") device, a mobile dynamic random access memory (mobile DRAM) device, etc.

The storage device 1130 may be a solid-state drive ("SSD") device, a hard disk drive ("HDD") device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In each pixel of the display device 1160, a fifth transistor may selectively couple a second node (e.g., a source node) to an anode of a light emitting element in response to a fourth signal (e.g., an emission signal). Accordingly, a gate-source voltage of a first transistor (e.g., a driving transistor) may not be affected by a parasitic capacitor of the light emitting element, and thus the pixel may emit light with desired luminance. Further, the first transistor may be turned on in a current characteristic compensation period, a voltage of the second node may be changed to compensate for a change of a current characteristic of the first transistor, and thus the pixel may emit light with the desired luminance.

The inventive concepts may be applied to any display device 1160, and any electronic device 1100 including the display device 1160. For example, the inventive concepts may be applied to a smart phone, a wearable electronic device, a tablet computer, a mobile phone, a television ("TV"), a digital TV, a 3D TV, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An electronic device comprising:

a processor configured to provide input image data; and a display device configured to receive the input image data from the processor, and to display an image based on the input image data, the display device including a pixel, the pixel comprising:

a first transistor including a gate coupled to a first node, a drain coupled to a first power supply voltage line, and a source coupled to a second node;

a first capacitor coupled between the first node and the second node;

a second transistor including a gate, which receives a first signal, a first terminal coupled to a data line, and a second terminal coupled to the first node;

a third transistor including a gate, which receives a second signal, a first terminal, which receives a reference voltage, and a second terminal coupled to the first node;

a fourth transistor including a gate, which receives a third signal, a first terminal coupled to the second node, and a second terminal, which receives an initialization voltage;

a light emitting element including an anode, and a cathode coupled to a second power supply voltage line; and a fifth transistor including a gate, which receives a fourth signal, a drain coupled to the second node, and a source coupled to the anode, wherein the first and fifth transistors are n-type metal oxide semiconductor (NMOS) transistors, wherein, in a threshold voltage compensation period, a power supply voltage is applied to the drain of the first transistor through the first power supply voltage line, the reference voltage is applied to the gate of the first transistor through the third transistor, the third transistor transfers the reference voltage to the first node, and the first transistor changes a voltage of the second node to a voltage corresponding to a threshold voltage of the first transistor subtracted from the reference voltage, wherein during the threshold voltage compensation period, the third transistor is turned on, and the second, fourth, and fifth transistors are turned off.

2. The electronic device of claim 1, wherein, during the threshold voltage compensation period, the fifth transistor is turned off to separate the second node from the anode.

3. The electronic device of claim 1, wherein at least one of the first through fifth transistors is implemented with an oxide transistor.

4. The electronic device of claim 1, further comprising:

a sixth transistor including a gate, which receives the third signal, a first terminal coupled to the anode, and a second terminal, which receives the initialization voltage.

5. The electronic device of claim 1, further comprising:

a sixth transistor including a gate, which receives the third signal, a first terminal coupled to the source of the first transistor, and a second terminal, which receives the initialization voltage.

6. The electronic device of claim 1, further comprising:

a sixth transistor including a gate, which receives the second signal, a first terminal coupled to the anode, and a second terminal, which receives the initialization voltage.

7. The electronic device of claim 1, further comprising:

a sixth transistor including a gate, which receives the second signal, a first terminal coupled to the source of the first transistor, and a second terminal, which receives the initialization voltage.

8. The electronic device of claim 1, further comprising:

a seventh transistor including a gate, which receives a fifth signal, a first terminal coupled to the first power supply voltage line, and a second terminal coupled to the drain of the first transistor.

9. The electronic device of claim 1, further comprising:

a second capacitor coupled between the first power supply voltage line and the second node.

10. The electronic device of claim 1, wherein, when a current characteristic of the first transistor is changed, a voltage of the second node is changed by a current of the first transistor to compensate for a change of the current characteristic of the first transistor.

11. The electronic device of claim 1, wherein the data line and an electrode of the source of the first transistor do not overlap each other such that a second parasitic capacitor between the second node and the data line has a capacitance less than a capacitance of a first parasitic capacitor between the anode and the data line.

12. The electronic device of claim 1, wherein each frame period for the pixel includes:

an initialization period in which the first node and the second node are initialized;

the threshold voltage compensation period in which a threshold voltage of the first transistor is stored in the first capacitor;

a data writing period in which a data voltage provided through the data line is transferred to the first node;

a current characteristic compensation period in which a change of a current characteristic of the first transistor is compensated; and an emission period in which the light emitting element emits light.

13. The electronic device of claim 12, wherein, in the current characteristic compensation period, the second signal, the third signal and the fourth signal have an inactive level, the drain of the first transistor receives the power supply voltage provided from the first power supply voltage line, the first transistor is turned on to apply a current to the second node, and the fifth transistor is turned off in response to the fourth signal having the inactive level to separate the second node from the anode.

14. The electronic device of claim 12, wherein the data writing period overlaps the current characteristic compensation period.

15. The electronic device of claim 12, wherein the data writing period is separate from the current characteristic compensation period.

16. An electronic device comprising:

a processor configured to provide input image data; and a display device configured to receive the input image data from the processor, and to display an image based on the input image data, the display device including a pixel, the pixel comprising:

a first transistor including a gate coupled to a first node, a drain coupled to a first power supply voltage line, and a source coupled to a second node;

a first capacitor coupled between the first node and the second node;

a second transistor including a gate, which receives a first signal, a first terminal coupled to a data line, and a second terminal coupled to the first node;

a third transistor including a gate, which receives a second signal, a first terminal, which receives a reference voltage, and a second terminal coupled to the first node;

a fourth transistor including a gate, which receives a third signal, a first terminal coupled to the second node, and a second terminal, which receives an initialization voltage;

a light emitting element including an anode, and a cathode coupled to a second power supply voltage line;

a fifth transistor including a gate, which receives a fourth signal, a drain coupled to the second node, and a source coupled to the anode; and a sixth transistor including a gate, which receives the second signal, a first terminal coupled to the anode, and a second terminal, which receives the initialization voltage, wherein the third and sixth transistors are n-type metal oxide semiconductor (NMOS) transistors, wherein, in a threshold voltage compensation period, a power supply voltage is applied to the drain of the first transistor through the first power supply voltage line, and the reference voltage is applied to the gate of the first transistor through the third transistor, wherein the threshold voltage compensation period starts when the fourth transistor is turned off and ends when the second transistor is turned on and the third transistor is turned off, and the fifth transistor is turned off during the threshold voltage compensation period.

17. The electronic device of claim 16, further comprising:

a seventh transistor including a gate, which receives a fifth signal, a first terminal coupled to the first power supply voltage line, and a second terminal coupled to the drain of the first transistor.

* * * * *